United States Patent
Owada

(10) Patent No.: US 9,108,110 B2
(45) Date of Patent: Aug. 18, 2015

(54) INFORMATION PROCESSING APPARATUS, INFORMATION PROCESSING METHOD, AND PROGRAM TO ALLOW CONVERSATION BETWEEN A PLURALITY OF APPLIANCES AND A USER

(75) Inventor: Shigeru Owada, Chiba (JP)

(73) Assignee: SONY CORPORATION, Tokyo (JP)

( * ) Notice: Subject to any disclaimer, the term of this patent is extended or adjusted under 35 U.S.C. 154(b) by 370 days.

(21) Appl. No.: 13/403,128

(22) Filed: Feb. 23, 2012

(65) Prior Publication Data
US 2012/0253818 A1   Oct. 4, 2012

(30) Foreign Application Priority Data

Mar. 31, 2011 (JP) ................. 2011-078318

(51) Int. Cl.
| G06F 3/0484 | (2013.01) |
| A63F 13/30 | (2014.01) |
| G10L 13/027 | (2013.01) |
| G09G 5/22 | (2006.01) |

(52) U.S. Cl.
CPC ......... *A63F 13/12* (2013.01); *A63F 2300/516* (2013.01); *A63F 2300/535* (2013.01); *A63F 2300/5533* (2013.01); *A63F 2300/632* (2013.01); *A63F 2300/8058* (2013.01); *G09G 5/22* (2013.01); *G10L 13/027* (2013.01)

(58) Field of Classification Search
USPC ......................................... 345/473
See application file for complete search history.

(56) References Cited

U.S. PATENT DOCUMENTS

| 8,667,100 | B2* | 3/2014 | Dixon et al. ............ 709/221 |
| 2003/0076341 | A1* | 4/2003 | Kuki ...................... 345/700 |
| 2006/0259183 | A1* | 11/2006 | Hayes et al. .............. 700/221 |
| 2009/0009521 | A1* | 1/2009 | Jeong et al. .............. 345/474 |
| 2012/0023212 | A1* | 1/2012 | Roth et al. ............... 709/223 |

* cited by examiner

*Primary Examiner* — David Zarka
*Assistant Examiner* — Richard M Russell
(74) *Attorney, Agent, or Firm* — Hazuki International, LLC

(57) ABSTRACT

There is provided an information processing apparatus including an operation information transmitting unit transmitting operation information for operating respective appliances out of a plurality of appliances connected via a network, a character processing unit carrying out processing relating to characters, which correspond to the respective appliances and have individual personalities, and changes a content represented by the characters in accordance with the operation information for operating the appliances, and a display processing unit carrying out processing that displays the characters on a display unit.

13 Claims, 15 Drawing Sheets

INFORMATION PROCESSING APPARATUS, INFORMATION PROCESSING METHOD, AND PROGRAM TO ALLOW CONVERSATION BETWEEN A PLURALITY OF APPLIANCES AND A USER

BACKGROUND

The present disclosure relates to an information processing apparatus, an information processing method, and a program.

In recent years, as networks (communication networks) such as the Internet have developed, it has become conceivably possible to connect even home appliances used in the home to a network and enable users to operate such appliances via the network, thereby improving convenience for the user.

SUMMARY

However, although it would be conceivably possible to connect appliances such as home appliances to a network and enable such appliances to be operated via the network, there has been no established framework for making users actively want to operate such appliances. There has also been a problem in that even when a plurality of home appliances are connected via a network, it is difficult for typical users to perceive any benefit from doing so.

For this reason, there is demand for a framework whereby the user grasps the states of respective appliances, such as home appliances, when making operations via a network and actively operates the appliances in accordance with their respective states.

According to an aspect of the present disclosure, there is provided an information processing apparatus including: an operation information transmitting unit transmitting operation information for operating respective appliances out of a plurality of appliances connected via a network; a character processing unit carrying out processing relating to characters, which correspond to the respective appliances and have individual personalities, and changes a content represented by the characters in accordance with the operation information for operating the appliances; and a display processing unit carrying out processing that displays the characters on a display unit.

As described above, according to the present disclosure, since the content represented by the characters changes in accordance with operation information for operating the appliances, it is possible for the user to make optimal operations of the appliances.

BRIEF DESCRIPTION OF THE DRAWINGS

FIG. 11 is a flowchart showing a linked operation that enquires about whether room lighting is on or off when the power of a TV has been switched on;

DETAILED DESCRIPTION OF THE EMBODIMENT(S)

Figure 1:
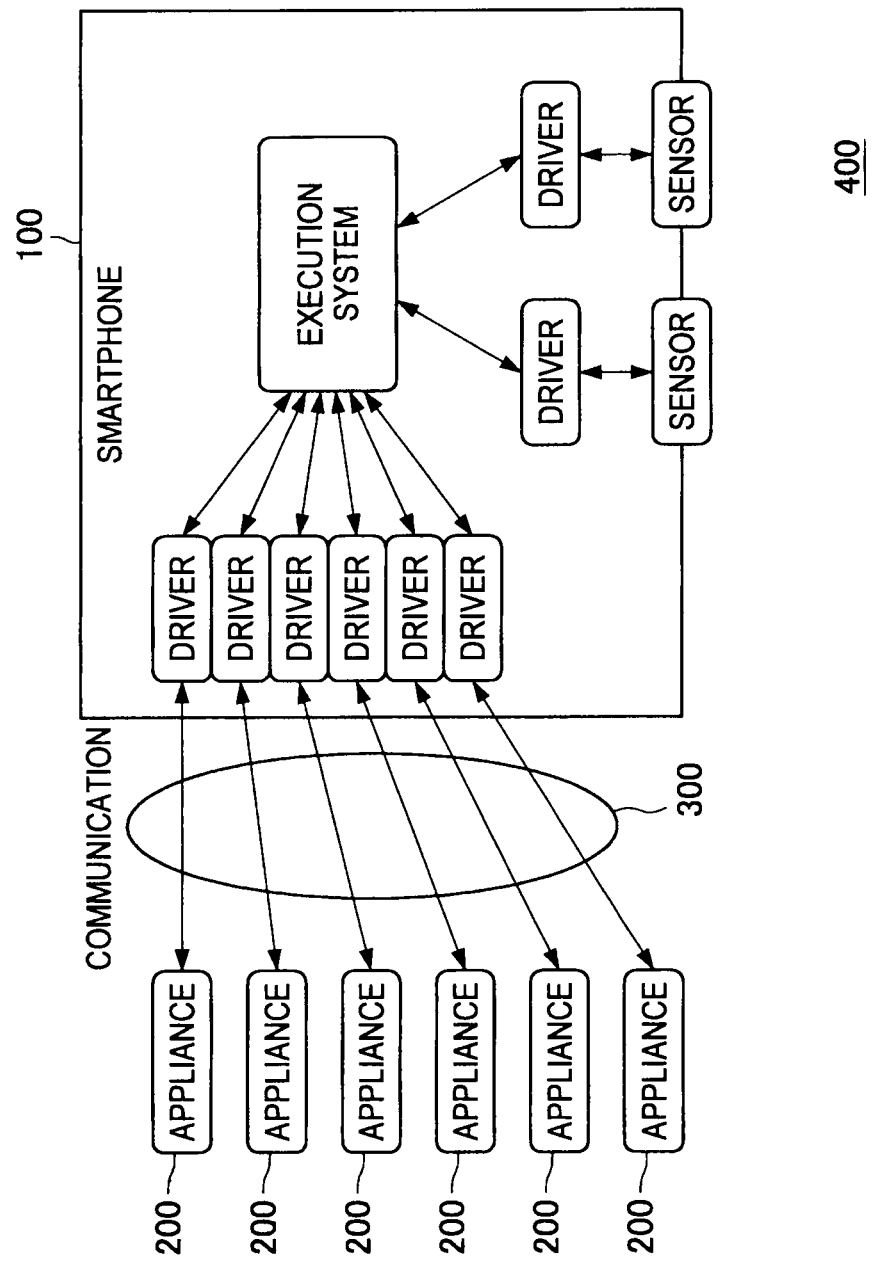
FIG. 1 is a schematic diagram showing the configuration of an information processing system according to the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order given below.
1. Example Configuration of Information Processing System
2. Example Configuration of Information Processing Apparatus
3. Processing of Character Processing Unit
4. Example Displays of Display Unit
5. Examples of Relationships between Characters and Scenarios
6. Processing of Information Processing Apparatus 1. Example Configuration of Information Processing System First, the overall configuration of an information processing system 400 according to an embodiment of the present disclosure will be described with reference to FIG. 1. The information processing system 400 includes a mobile information processing apparatus 100 and a plurality of appliances 200. The information processing apparatus 100 and the plurality of appliances 200 are connected via a network 300 such as the Internet.

The information processing apparatus 100 is constructed for example of a mobile terminal such as a smartphone, acquires information on the respective appliances 200 via the network 300, and outputs operation instructions to the respective appliances 200 in accordance with user operations, thereby enabling the user to operate the respective appliances 200. That is, the information processing apparatus 100 is capable of functioning as a remote controller for operating the respective appliances 200.

Also, in the present embodiment, home appliances used in the home are shown as examples of the plurality of appliances 200. As one example, the plurality of appliances 200 include various appliances used in the home, such as a television set (TV), a recording/playback apparatus such as a DVD player or a BD (BluRay disc) player, an air conditioner, a fan, a storage cell, a photovoltaic cell, and a room lighting apparatus. By operating the information processing apparatus 100, the user is capable of having the respective appliances 200 carry out desired operations. Note that the plurality of appliances 200 may be appliances aside from home appliances. For example, the appliances 200 may be sensors or the like that acquire the states of plants.

2. Example Configuration of Information Processing Apparatus

Figure 2:
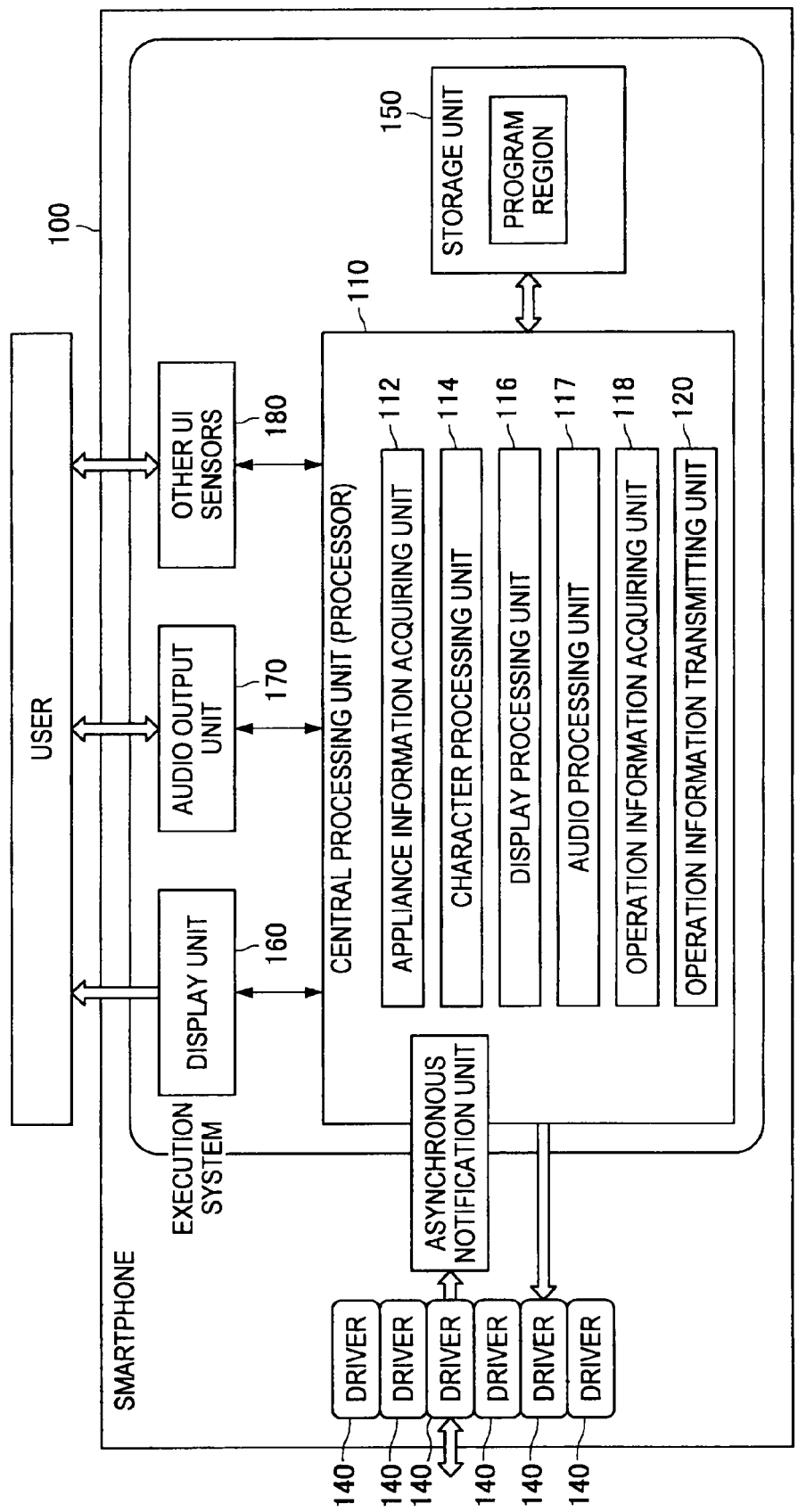
FIG. 2 is a schematic diagram showing the configuration of an information processing apparatus.

FIG. 2 is a schematic diagram showing the configuration of the information processing apparatus 100. The information processing apparatus 100 includes a central processing unit (CPU) 110, a plurality of drivers 140, a storage unit 150, a display unit 160, an audio output unit 170, and various UI sensors 180.

The CPU 110 controls the various structural elements of the information processing apparatus 100. The various UI sensors 180 include an input apparatus such as operation buttons and touch sensors. The CPU 110 controls the structural elements of the information processing apparatus 100 in accordance with operations of the various UI sensors 180, and is capable of sending operation information for operating the respective appliances 200 via the network 300 to the appliances 200 to operate the appliances 200. The CPU 110 is also capable of outputting the respective states of the appliances 200 acquired via the drivers 140 as a display on the display unit 160 and as an audio/speech output from the audio output unit 170.

As shown in FIG. 2, the CPU 110 includes an appliance information acquiring unit 112, a character processing unit 114, a display processing unit 116, an audio processing unit 117, an operation information acquiring unit 118, and an operation information transmitting unit 120. The respective structural elements shown in FIG. 2 can be configured from the CPU 110 and a program for causing the CPU 110 to function. As one example, such program is capable of being acquired by downloading via the network 300 and being stored in the storage unit 150. Also, the program may be stored on a recording medium that is externally connected and by connecting such recording medium to the information processing apparatus 100, it is possible to cause the CPU 110 to function as the respective structural elements.

The appliance information acquiring unit 112 acquires information on the respective appliances 200 (also referred to as "state information for the appliances"). The information on the respective appliances 200 includes various information such as a power on/off state and an operating state of the respective appliances 200. Note that if a record of every transmission of operation information transmitted by the operation information transmitting unit 120 is stored, it is also possible to infer the present states of the appliances 200. For example, in the case of a room lighting apparatus, if there is a record showing that a power off command has just been transmitted, it is possible to infer that the power is off without needing to newly acquire information.

The character processing unit 114 is one characteristic structural element of the present embodiment and carries out processing relating to characters that correspond to the respective appliances 200 and personify the respective appliances 200. Based on the states of the appliances 200 or the operation information for operating the appliances 200, the character processing unit 114 applies a display state of the characters, a conversation relating to the characters, or a scenario stored in the storage unit 150 to the characters and changes the content of the processing expressed by the respective characters (i.e., the states, conversation, scenario, and the like of the characters). For example, the character processing unit 114 carries out processing that changes the display state of characters (as one example, the outfits and the like of the characters), changes the conversation between the characters, and/or changes the scenario in accordance with the operations of the appliances 200 (as one example, in accordance with a movie or other content being played back on a BD player). Such processing relating to characters will be described in detail later based on example scenarios.

The display processing unit 116 carries out processing for displaying various information on the display unit 160. The display processing unit 116 carries out processing for displaying information on the various appliances 200 acquired by the appliance information acquiring unit 112. Also, the display processing unit 116 carries out display processing relating to the processing of characters by the character processing unit 114 and carries out processing that displays a scenario composed of a conversation between the characters and a conversation between the characters and the user. Here, the expression "conversation" includes the content of dialog of the respective characters, with information being exchanged by way of conversations between the respective characters and operation inputs made by the user. A "scenario" can include a plurality of "conversations" and adds operation information of the appliances 200 or information showing the states of the appliances 200 to the information on the conversations, so that the content of a scenario can progressively change or develop. That is, a scenario adds operation information of the appliances 200 or state information of the appliances 200 to conversation information and has a content that can progressively change due to branches in processing in keeping with conditions set according to the operation information or the state information. The processing result of the display processing unit 116 is sent to the display unit 160 and displayed.

The audio processing unit 117 carries out processing for outputting various information as audio and/or speech from the audio output unit 170. The audio processing unit 117 carries out processing for outputting information on the respective appliances 200 acquired by the appliance information acquiring unit 112 as audio and/or speech. The audio processing unit 117 also carries out processing for outputting audio relating to the processing of characters carried out by the character processing unit 114 and carries out processing to output conversations between characters and a scenario as audio and/or speech. The processing result of the audio processing unit 117 is sent to the audio output unit 170 and is outputted to the periphery as audio and/or speech.

The operation information acquiring unit 118 carries out processing that acquires operation information for operations made by the user. The operation information acquiring unit 118 acquires operation information inputted by the user into the various UI sensors 180.

The operation information transmitting unit 120 carries out processing that transmits the operation information for user operations acquired by the operation information acquiring unit 118 to the respective appliances 200. When a plurality of appliances 200 are operated in a linked manner, the operation information transmitting unit 120 also transmits operation information for operating other appliances 200 in accordance with the state of an arbitrary appliance 200 acquired by the operation information acquiring unit 118. In such case, the operation information transmitting unit 120 is capable of transmitting operation information for operating the other appliances 200 in accordance with the state of an arbitrary appliance 200 acquired by the operation information acquiring unit 118 and the operation information from the user.

The drivers 140 are provided corresponding to the respective appliances 200, convert the operation information to be sent to the respective appliances 200 by the operation information transmitting unit 120 to protocols corresponding to the appliances 200, and transmit the converted information to the appliances 200.

The display unit 160 is constructed for example of a liquid crystal display (LCD), and displays information in accordance with the processing by the display processing unit 116. The various UI sensors 180 include touch sensors, and when the operation inputs are made by the user using touch sensors, the touch sensors are disposed on the display screen of the display unit 160. The various UI sensors 180 also include a GPS sensor that acquires a range of movement and movement path of the user. The movement range and movement path of the user acquired by the GPS sensor are stored in the storage unit 150.

The audio output unit 170 is constructed of an audio output apparatus such as a speaker. The audio output unit 170 outputs audio and/or speech in accordance with the processing by the audio processing unit 117.

The storage unit 150 is constructed of ROM, RAM, a hard disk drive, or the like and stores a program for causing the CPU 110 to function. The storage unit 150 also stores information that is characteristic to the present embodiment, such as information relating to characters and information relating to scenarios and the like. Such information relating to characters and information relating to scenarios and the like can be downloaded via the network 300. The storage unit 150 is also capable of storing information such as room information (number of rooms, floor plan) for the rooms in the user's home and information showing which appliances 200 are present in which rooms. The operation information acquiring unit 118 causes the display processing unit 116 to function based on the operation information on a user operation acquired from the UI sensors 180 and as a result, information indicated by the user operation is read out from the storage unit 150 and displayed on the display unit 160. The operation information acquiring unit 118 is also capable of changing the information stored in the storage unit 150 based on operation information on a user operation acquired from the UI sensors 180.

The information processing apparatus 100 is also capable of keeping a "lifelog" (that is, a daily activity pattern, preferred way of using home appliances, and the like) of the user in accordance with operations made by the user and can store the collected information (i.e., lifelog) in the storage unit 150. The character processing unit 114 is capable of changing the pattern of conversations and the scenarios in accordance with the lifelog.

3. Processing of Character Processing Unit

Figure 3:
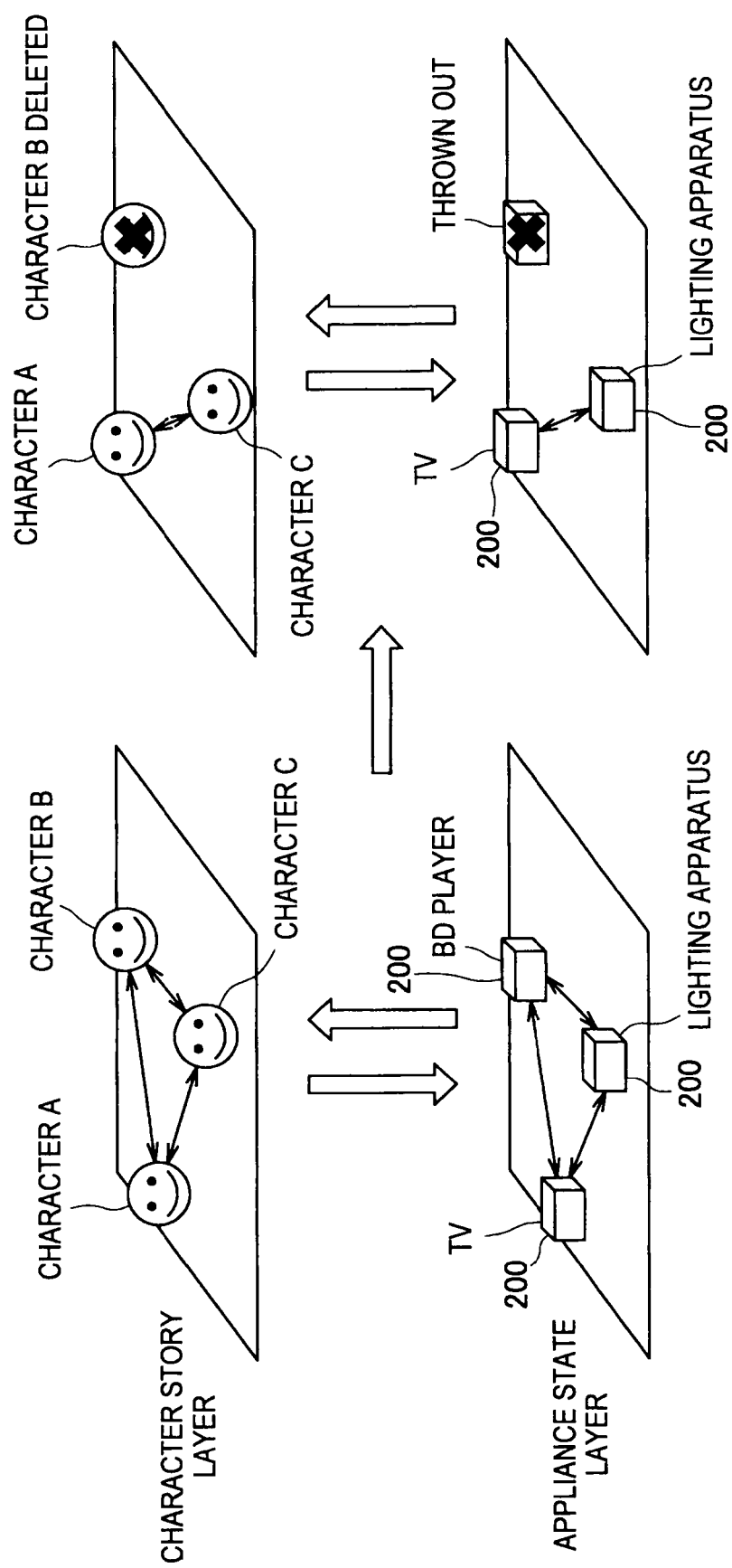
FIG. 3 is a schematic diagram useful in explaining the relationship between appliances and characters associated with respective appliances.

Next, the processing of the character processing unit 114 will be described. FIG. 3 is a schematic diagram showing the relationship between the respective appliances 200 and the characters that are associated with such appliances 200. Such relationship is characteristic to the present embodiment.

In FIG. 3, an appliance state layer, which is a layer of the appliances 200, and a character story layer, which is a layer showing a story which includes characters, are shown associated with each other. In FIG. 3, three appliances made up of a TV, a BD player, and a lighting apparatus are shown as the appliances 200. Character A, character B, and character C are also shown as the characters corresponding to the three appliances 200.

The respective characters A, B, and C are virtual characters that each have individual personalities. As shown in FIG. 3, the relationship between the characters and the relationship between the appliances 200 are capable of affecting one another. That is, the appliances 200 and the characters are associated with one another, and the relationships between the appliances 200 and the relationships between the characters are also associated with one another and are capable of affecting one another. Changes over time in such relationships are also associated with one another between the character layer and the appliance 200 layer. Accordingly, as shown in FIG. 3, if, as a change over time, the BD player out of the three appliances 200 ceases to be present in the house due to being thrown out or the like, by making a change such as removing the character B corresponding to the BD player, the new reality where such appliance is no longer present is also reflected in the characters.

In the present embodiment, the characters corresponding to the respective appliances 200 function so as to inform the user of the states of the corresponding appliances 200, to receive operations from the user, and to have such operations reflected by the appliances 200. In this case, since the respective characters all have individual personalities, the user is capable of operating the respective appliances 200 while recognizing the states of the appliances 200 and enjoying conversations with the individual characters who have different personalities.

By doing so, the user is capable of receiving information on the appliances 200 provided by the respective characters and providing operation information for the appliances 200 via the characters while appreciating the personalities of the individual characters. By doing so, it becomes possible for the user to operate the respective appliances 200 in a game-like environment. Also, by having the user empathize with the respective characters, it is possible to promote further use of the information processing system 400 by the user. In addition, the combination of the home appliances owned by each user and changes over time in such combination will reflect the user's preferences and changes over time in such preferences, and can therefore be thought of as being one type of lifelog. Such information is therefore useful when making the characters more attractive to users. By using such characteristics, it is possible for the present embodiment to promote further usage of a home appliance network and to stimulate the user's desire to purchase new appliances 200. The configuration relating to characters can be realized by producing a smartphone application and downloading such application to a smartphone. A variety of sensor information from the various UI sensors 180 and the like can also be used to improve the conversations with the characters and the scenarios.

Note that since various combinations of home appliances are possible and a great variety of scenarios and episodes can be imagined, it would also be possible to have the application produced by a community of fans of animation, manga comics, artwork, cosplay, model figures, or the like. Accordingly, it would also be possible to promote use of a home appliance network by having the application created outside the manufacturer as a "fan fiction" type of derivative work.

As one example, it is possible to have the system according to the present embodiment operate using a script language. By designing such language to facilitate the creation of derivative work or using an open platform, it is possible to facilitate the construction of a home appliance network by a fan community. It would also be possible for such fan communities to produce highly customized content for each home appliance or for a particular device or devices. It is also hoped that such communities could come up with ideas relating to cooperative usage of home appliances that go beyond what the manufacturers themselves could imagine, and that the content produced by fan communities or the like could even contribute to the spread of home appliance networks and the sales of home appliances.

Note that although a mobile appliance such as a smartphone is used as the information processing apparatus 100 in the present embodiment, it is possible for a smartphone to sufficiently transmit and receive videos of a standard size, which provides great flexibility when producing content. If the operation API of appliances is standardized (as with MIDI, for example), it would be easy to share operating system features between appliances and provide compatibility for appliances expected to appear in the future.

Figure 4:
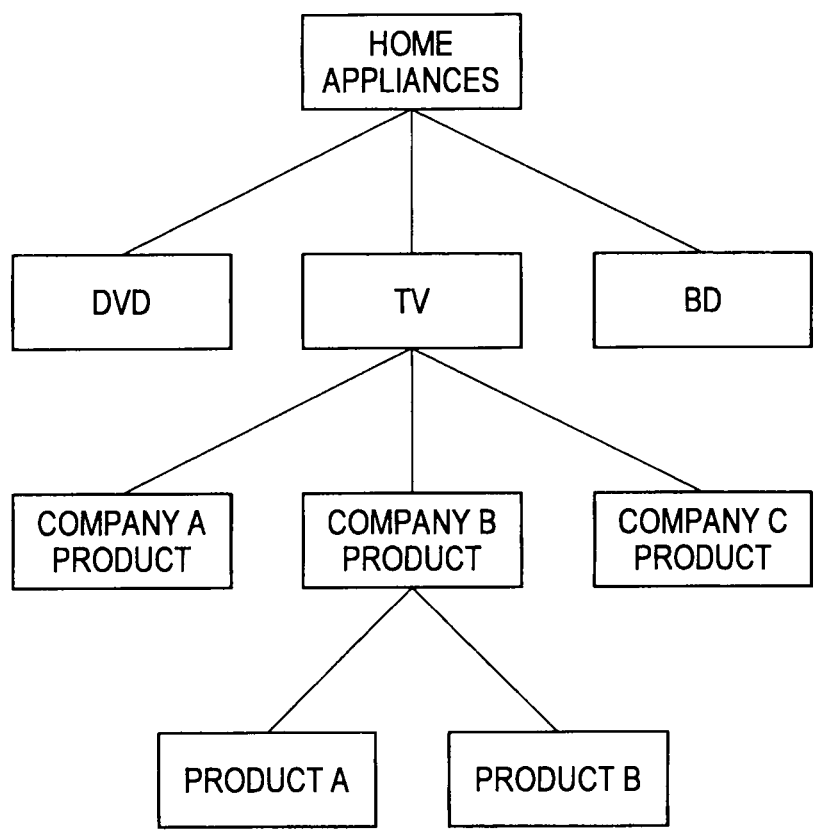
FIG. 4 is a schematic diagram showing one example of personalities of characters associated with categories of appliances arranged into a hierarchy.
Figure 5:
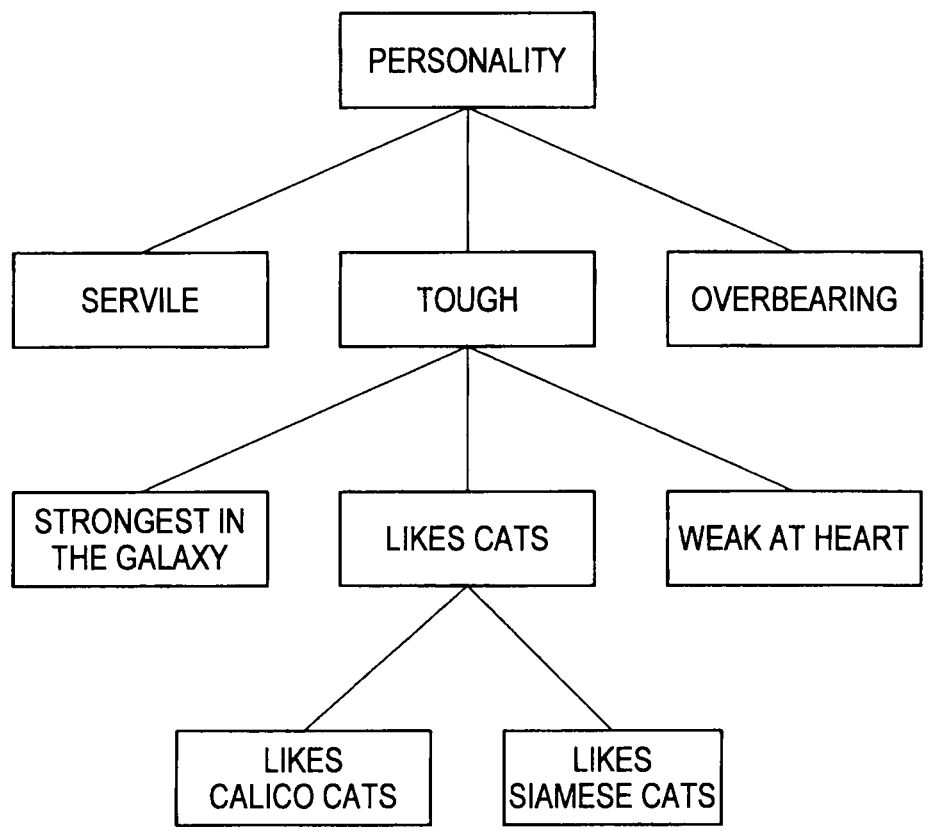
FIG. 5 is a schematic diagram showing one example of personalities of characters associated with categories of appliances arranged into a hierarchy.

FIGS. 4 and 5 are schematic diagrams showing one example of the assignment of personalities to the characters corresponding to categories of the respective appliances 200 arranged in a hierarchy. Here, FIG. 4 shows the categories of actual appliances 200. Also, FIG. 5 shows the personalities of the characters associated with the respective appliances 200 shown in FIG. 4.

Also in the example in FIG. 4, as the categories of home appliances, the three categories of DVD player, TV, and Blu-Ray (BD) player are shown. Also as shown in FIG. 5, "servile", "tough", and "overbearing" are respectively associated with DVD player, TV, and BD player as the personalities of the corresponding characters Also, as in the example in FIG. 4, "Company A products", "Company B products", and "Company C products" are given for "TV", and as shown in FIG. 5, although the characters corresponding to such products have "tough" as a common personality trait, such personality is further categorized into "strongest in the galaxy", "likes cats", and "weak at heart" on a lower level in the hierarchy. Also, "Product A" and "Product B" are given as "Company B products", and the more detailed personality traits "likes calico cats" and "likes Siamese cats" are given for the characters respectively corresponding to such products. In this way, by having the system provider arrange the personalities of characters into a hierarchy, it is possible to provide a personality guide (index) to home appliance manufacturers or the like that wish to participate in the system. Accordingly, when a new appliance 200 that wishes to join in the system appears, so long as the story of such character has been produced in accordance with the guide and the new appliance 200 belongs to an existing category, it will be possible for the user to enjoy the story in an existing scenario. It is also possible for the user to operate the appliances 200 by interacting with the characters corresponding to the appliances 200 while enjoying the personalities of the characters.

In this way, by introducing characters into the respective appliances 200 used in the home, it is possible to add a completely different meaning to the past to a network that connects appliances, and by doing so, to create a completely new type of demand. For example, by setting the characters so as to appeal to a user's desire to form a collection, it is possible to encourage the user to purchase a plurality of appliances 200 as a single set. It is also possible to encourage a user who is not interested in the appliances 200 themselves but who likes the characters to purchase the appliances 200.

Also, by assigning personalities to the characters corresponding to the appliances 200 as shown below, it is possible to promote usage of the information processing system 400 by the user and to encourage the user to purchase more appliances 200.

Some potential uses and business ideas are listed below.

Changing the character by updating the software of an appliance 200. By doing so, it is possible to make updating into a revenue-generating business.

By storing and controlling state transitions for a home appliance, it is possible to change the respective characters and change how the scenario (game) develops according to the characters.

Generating content for characters based on the lifelog of home appliances.

Here the respective characters are given individual personalities using a collection of "speech patterns" and/or various devices in the scenarios. That is, the characters are given personalities not only through their spoken content but also by the timing at which the characters appear and the facial expressions and postures of the characters, which enables the personalities of the respective characters to make a large impression on the user. As speech patterns, it is also possible to generate conditional speech where a match pattern and a reply are paired (as one example, "Hi" followed by "Hey! How've you been?"). In particular, it is possible to produce speech for other indicated parties. When generating a new collection of speech patterns, by using existing speech patterns as a base, it is possible to produce a new personality (a new collection of speech patterns) by simply rewriting parts that do not match the creator's intended personality. In such case, it is possible to fundamentally reuse the core personality which is then customized to produce a new personality.

4. Example Displays of Display Unit

Figure 6:
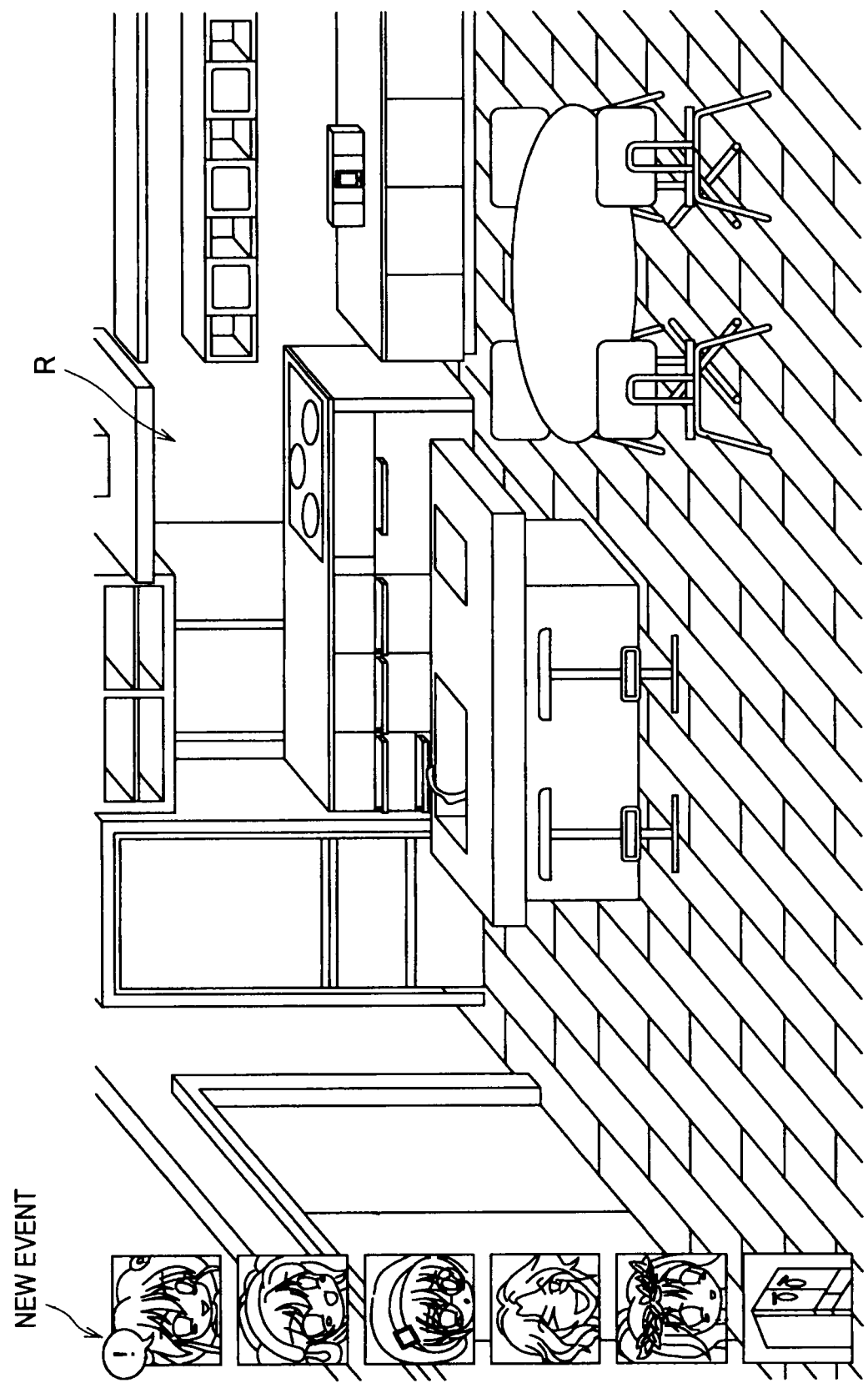
FIG. 6 is a schematic diagram showing an example display of a display unit.

FIGS. 6 to 9 are schematic diagrams showing example displays of the display unit 160. Here, FIG. 6 shows an initial screen for a case where the user has operated the UI sensors 180 to indicate a specific room R in the home and an image of such room R is displayed along with icons of characters corresponding to the appliances 200 present in the room R on the left edge of the screen. In addition, when an exclamation point "!" is added to the icon of a character, this indicates that some change in state (or "event") has occurred for the appliance corresponding to such character.

Figure 7:
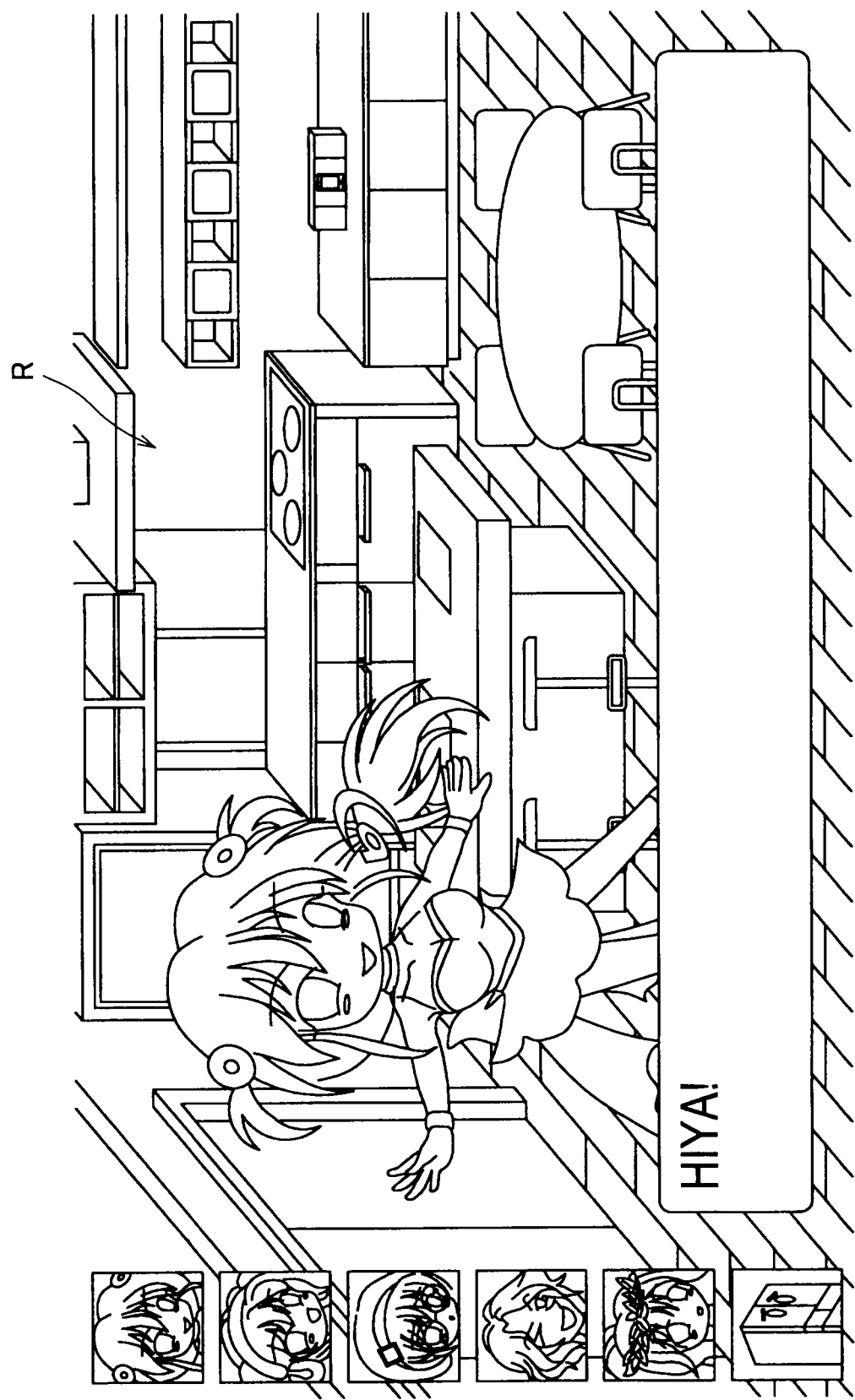
FIG. 7 is a schematic diagram showing an example display of a display unit.

FIG. 7 shows a state where, from the state in FIG. 6, the user has clicked the icon of a character by making a touch panel operation. When the user has clicked the icon of a character, the character is displayed so as to be enlarged on the left side of the screen. Also, as shown in FIG. 7, the content of speech made by the character whose icon has been selected is displayed in the lower part of the screen of the display unit 160. By operating the UI sensors 180, the user is capable of conversing with the character and/or of inputting an instruction for operating the appliance 200 corresponding to the character. The character displayed on the left side of the screen carries out operations such as nodding her head and moving her body in keeping with the conversation. It is also assumed here that the character's way of speech reflects the personality of the character. The character's dialog changes in accordance with the state of the corresponding appliance 200, the conversation with the user, and instructions from the user, with the character's dialog being displayed and audibly outputted in accordance with speech patterns and scenarios stored in the storage unit 150. For this reason, the image, actions, way of speech, and the like of a character can enable the user to empathize with the character. By conversing with the character, the user is capable of recognizing the state of the appliance 200 corresponding to the character and of operating the appliance 200.

Figure 8:
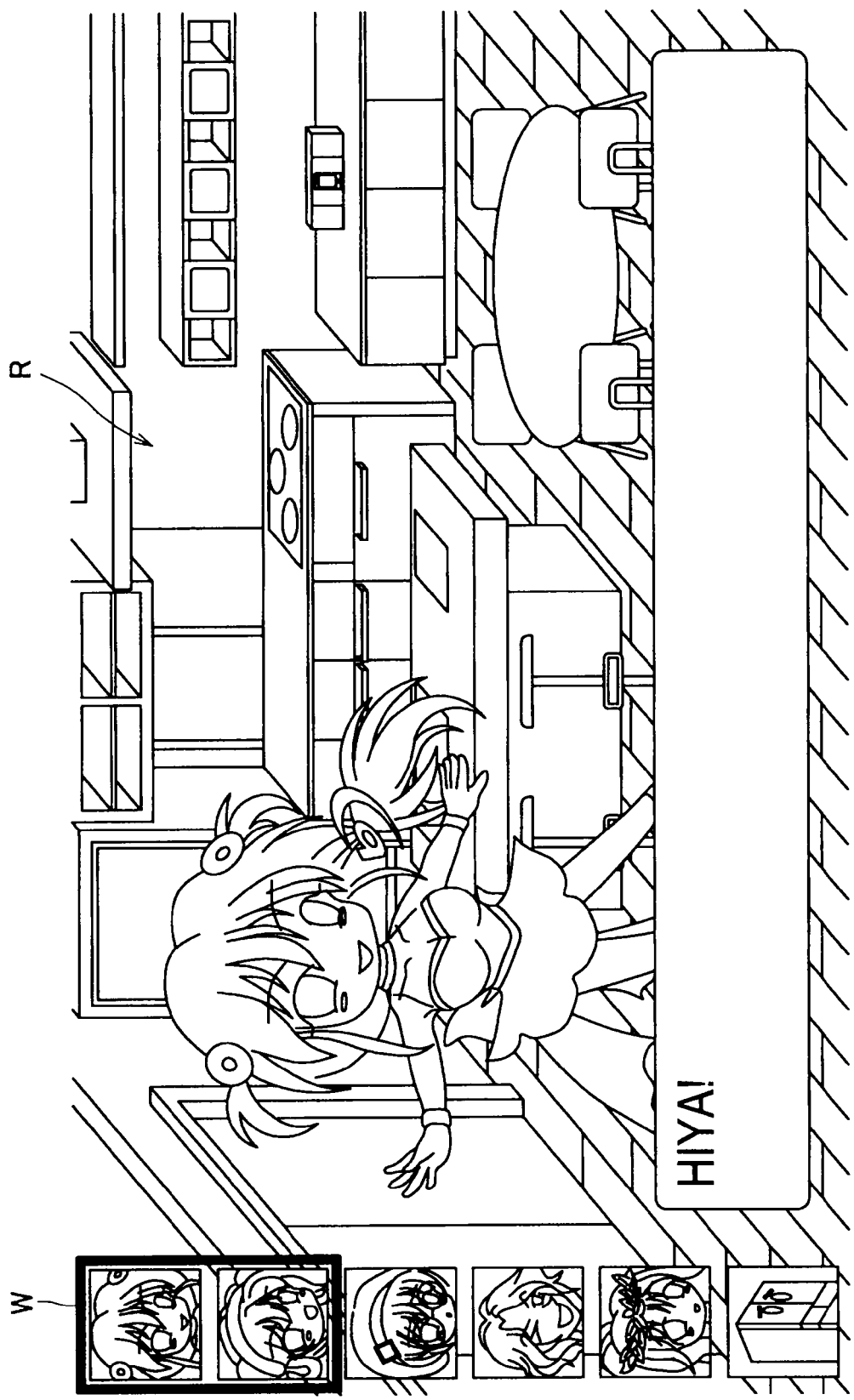
FIG. 8 is a schematic diagram showing an example display of a display unit.

FIG. 8 is a schematic diagram showing an example where icons corresponding to the appliances 200 present in the room R indicated by the user are displayed on the display screen of the display unit 160 together with the icons corresponding to the appliances 200 present in all of the rooms on the first floor of the home. In the example shown in FIG. 8, out of the icons aligned on the left edge of the screen, only the two top icons are surrounded by a frame W, showing that only the appliances 200 corresponding to the characters of such two icons are present inside the room R indicated by the user. In this case, out of the icons aligned on the left edge of the screen, the appliances 200 corresponding to the characters of the four lower icons are present in the home but are not present inside the room R indicated by the user. By operating the four lower icons out of the icons aligned on the left edge, the user is capable of acquiring information on the appliances 200 that are present in rooms aside from the indicated room R.

Figure 9:
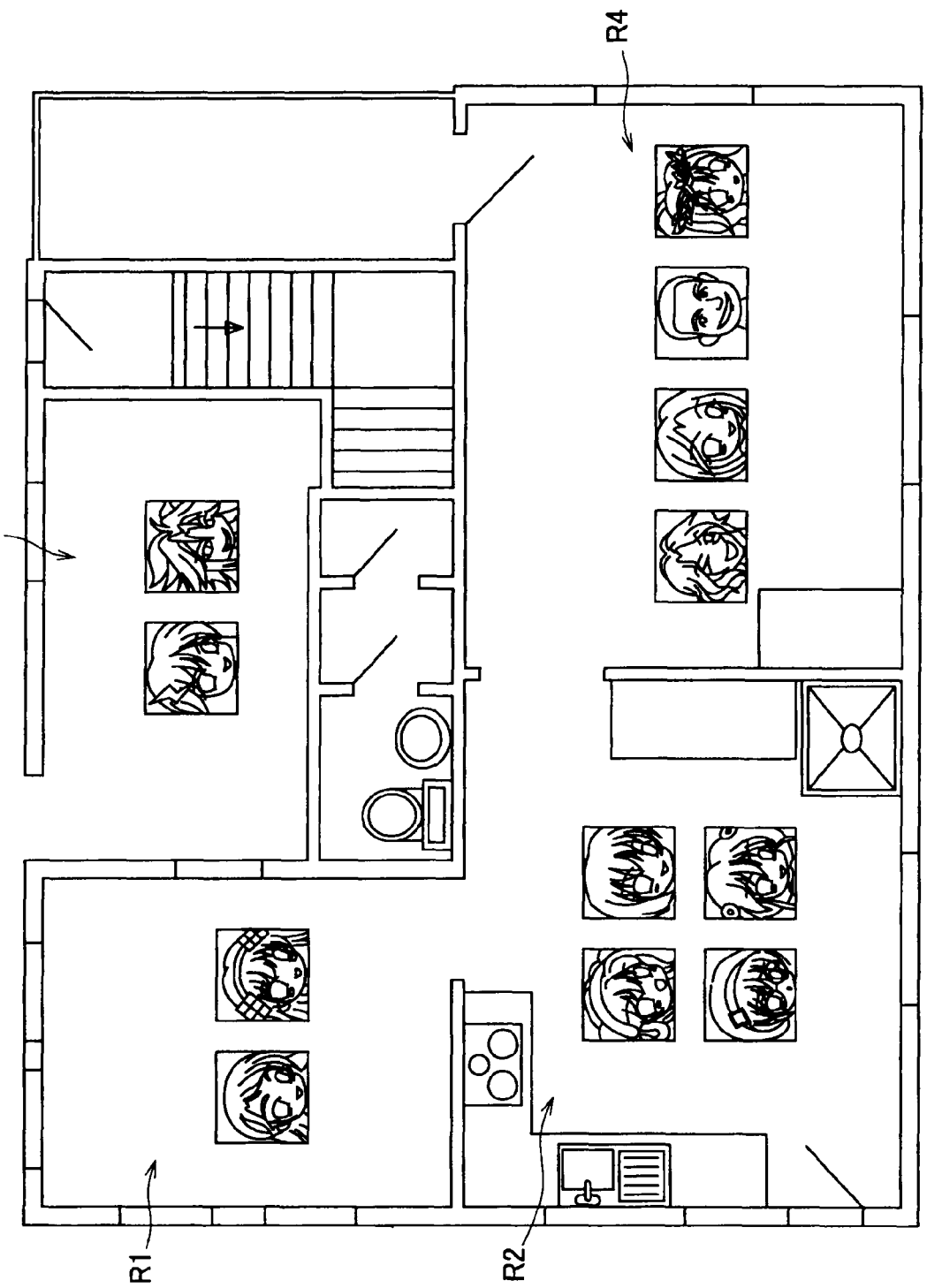
FIG. 9 is a schematic diagram showing an example display of a display unit.

FIG. 9 is a schematic diagram showing an example where all of the rooms R1 to R4 on the first floor of the home are displayed. In this case, a plan view of the rooms R1 to R4 on the first floor and icons corresponding to the appliances 200 present in the rooms R1 to R4 are displayed, making it possible for the user to instantly recognize which appliances 200 are present in which rooms. In this case also, by operating the icons corresponding to the appliances 200 in the rooms R1 to R4, the user is capable of acquiring information on the appliances 200 and operating the respective appliances 200. In this way, by displaying the appliances 200 present in all of the rooms inside the home, it is possible for the user to make operations that are appropriate for the states of all of the appliances 200 in the home.

5. Examples of Relationships Between Characters and Scenarios

Figure 10:
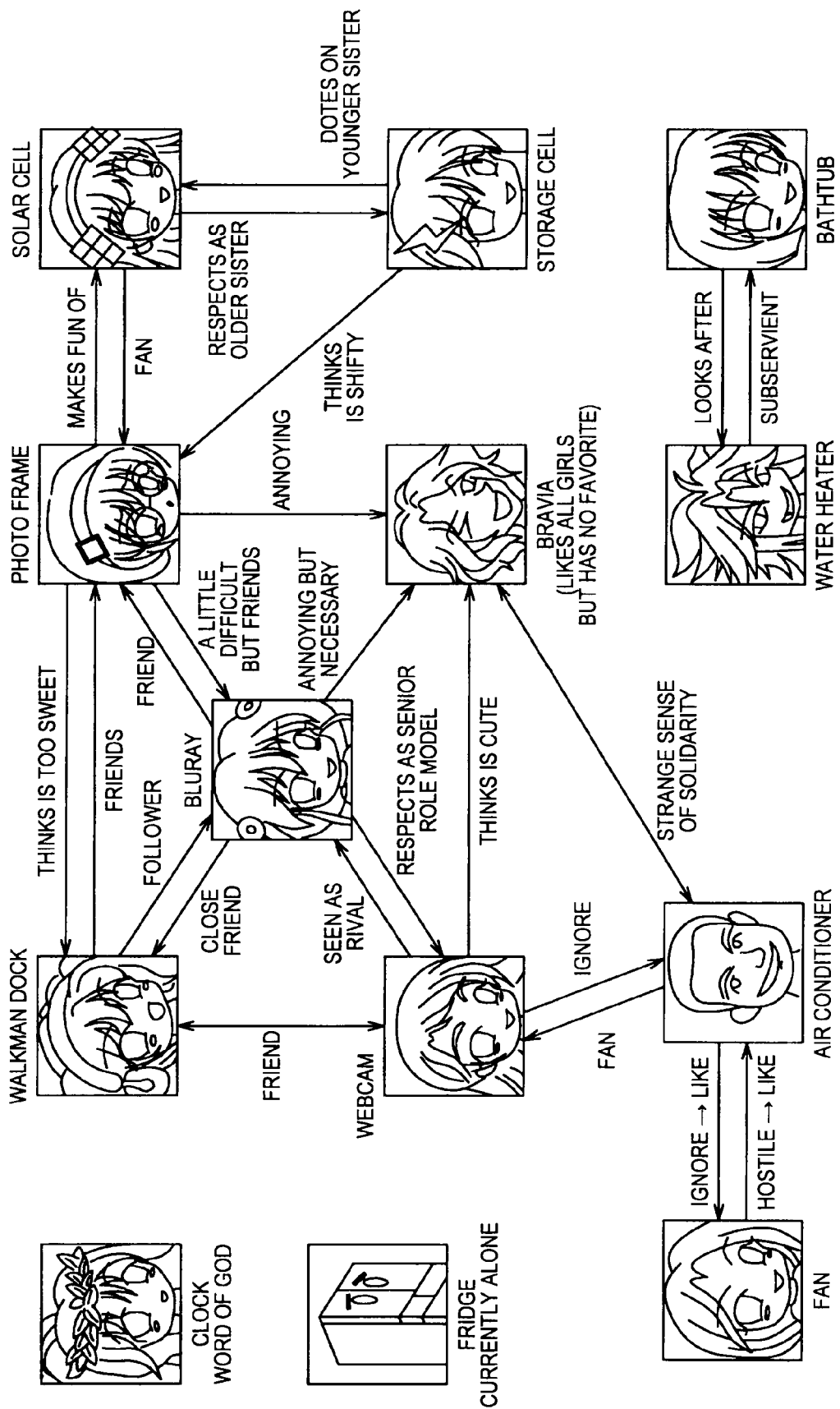
FIG. 10 is a schematic diagram showing the relationships between characters.

FIG. 10 is a schematic diagram showing the relationships between characters. As shown in FIG. 10, unique personalities are assigned to the respective characters. Here, it is assumed that a clock, a fridge, a Walkman dock, a webcam, an air conditioner, a fan, a BluRay (BD) player, a photo frame, a TV (called a "Bravia"), a solar cell, a storage cell, a water heater, and a bathtub are present as the appliances 200 present in the rooms. It is also assumed that characters such as those shown in FIG. 10 are present for the appliances 200. Also, although omitted from FIG. 10, appliances 200 such as lighting appliances (fluorescent lights) are present in the respective rooms of the home and have characters set corresponding thereto.

Note that the character of the webcam has been given a role as an external representative of the user's home. The webcam continuously photographs an object of pride present in the user's home (to record the growth of a plant, for example). An introductory explanation for the webcam is written by the user. The webcam that serves as an external representative is capable of autonomously searching a network and accessing a server that stores photographs taken by webcams in each home. Assume here that a character that serves as the external representative of another home (for example, the webcam of another home) has been discovered. The two characters (i.e., the two webcams) then become friends, take memorial photos in each other's houses, and exchange photos and exchange messages. By doing so, an SNS (Social Network Service) is autonomously formed and it becomes possible for users who have seen such service to generate messages and to become friends via the characters.

Examples of scenarios (Scene 1 to Scene 13) are shown below for a case where the user operates the respective appliances 200 by conversing with the characters. Note that in the scenarios shown below, the "panel" represents the display screen of the display unit 160. Also, "Moe Appliances" is the name of the present system. In the respective scenes, the participants in the conversations are the characters shown in FIG. 10. The user views the display screen of the display unit 160 and by operating a touch panel, is capable of viewing the scenarios shown below on the display screen and of listening to speech output in the conversations outputted from the audio output unit 170. The processing of the scenarios is mainly realized by the processing of the character processing unit 114 in the CPU 110. The character processing unit 114 reads out different scenarios from the storage unit 150 in accordance with the states of the appliances 200 and instructions from the user. By having the display processing unit 116 and the audio processing unit 117 carry out processing in accordance with the scenario and the characters, it is possible to display dialog and output speech as shown in FIG. 7.

---

Scene 1
Concept: The services provided at home are changed according to the lifelog of that particular day stored in the smartphone. All the characters are shown welcoming the user.
Characters in scene: All
Explanation: {This smartphone knows my (the user's) activities today. A program has been running all day and has continuously recorded GPS information. By using this information, Moe Appliances will change their services precisely every day in keeping with my activities} (Note that hereinafter, all text given in "{ }" marks indicates speech given as explanation).
{A control panel connected to the appliances in the home is provided at the entrance to the house. By placing the smartphone below this panel on returning home (or by pressing a specified button of the information processing apparatus 100 even when outside the home), the Moe Appliances game is launched. The display screen of the control panel is also displayed on the display unit 160 of the information processing apparatus 100.}
[BD Player]    Ah?
[BD Player]    The Master has come home!
[BD Player]    Welcome back!
[BD Player]    Everyone, the Master is home!
[BD Player]    This way, Master!
(The character exits the panel and appears on the smartphone before exiting again)
(All characters appear on the panel and greet the user, then exit and appear on the smartphone. The characters are shown jumping down from the panel on the wall into the smartphone)
[Walkman Dock]    Welcome home!
[Photo Frame]     Hey, you're back!
[Bravia]          I've been bored. Do you wanna watch some TV?
[Camera]          Welcome back!
[Fan]             I thought you'd never come back.
[Air Conditioner] I've been waiting for you!
[Solar Cell]      Yes!!
[Storage Cell]    . . .
[Fridge]          Yeah!
[Water Heater]    Zzzzzz (eyes are closed)
[Bathtub]         Good to see you! Take it easy!
[Clock]           Welcome back. You're early today!
(The story from now on takes place entirely on the smartphone)
[Clock]           Everyone, settle down now! (gives big smile and twinkles)
[Bathtub]         Now you're home, straight in the bath!
[Clock]           Now Bathtub, I think it's too early for that. We're not ready.
[Water Heater]    I've not got the water ready yet.
[BluRay Player]   Okay then, I'll take over.
[BluRay Player]   Well, according to the Master's log . . .
[BluRay Player]   You've driven to work but didn't go out on business today.
[BluRay Player]   Maybe you're not so tired.
[BluRay Player]   A trailer for a new movie arrived just earlier on.
[BluRay Player]   Do you want to see it? Let's watch it!
0: Watch    1: Not now
(Here, by operating the UI sensors 180 of the information processing apparatus 100 to input "0" or "1", the user is capable of giving an instruction to operate the appliance 200. Hereinafter, numbers such as 0, 1, 2, 3 . . . indicate a selection operation inputted by the user)
"0" [BluRay Player]    Okay! Do you want to come upstairs? (Advance to "4")
"1" [Bathtub]          So would you like your bath now?
2: Take bath    3: Not now
"2" [Bathtub]          Great! Hey Heater! Get the hot water ready!
[Water Heater]         I'm sorry but I'm just not ready.
[Water Heater]         Could you wait a little longer? (Advance to "3")
"3" [Bathtub]          Oh well! Not at the moment then!
[BD Player]            Would you like to see a movie trailer?

|  |  |
|---|---|
| [Clock] | That might be a good idea. |
| [Clock] | Make your way upstairs to the living room (Advance to "4") |
| "4" [BD Player] | I'll stick my power on. You too Bravia! |
| [Bravia] | Hey BD! What's up? |
| [BD Player] | The Master's gonna watch a movie trailer. Stick your power on. |
| [Bravia] | Anything for you BD! Here you go! |
| [BD Player] | Thanks (she's a creep). We're waiting for you upstairs, Master! |

Explanation: {And so the game commences. Please take this smartphone up to the second floor.}

| [Bathtub] | Now you're home, straight in the bath! |
|---|---|
| 5: Take bath | 6: Not now |
| "5" [Bathtub] | Great! Hey Heater! Get the hot water ready! |
| [Water Heater] | I'm sorry but I'm just not ready. |
| [Water Heater] | Could you wait a little longer (Advance to "6") |
| "6" [Bathtub] | Oh well! Not at the moment then! |

| [BD Player] | Okay then, I'll take over! |
|---|---|
| [BD Player] | Well, according to the Master's log . . . |
| [BD Player] | You've been out and about and on the move all day! |
| [BD Player] | You must be so tired. |
| [BD Player] | A trailer for a new movie arrived earlier on. Do you want to sit back and watch it? |
| [BD Player] | Do you want to see it? Let's watch it! |
| 7: Watch | 8: Not now |
| "7" [BD Player] | Okay! Come up to the living room! (Advance to "4") |
| "8" [Bravia] | How about watching some TV? |
| [Clock] | That might be a good idea. |
| [BluRay Player] | I'll just stick my power on. |
| [Clock] | Make your way to the living room (Advance to "4") |

Explanation: {And so the game commences. This part is an example of how the services provided to the user by a home appliance network change according to the lifelog. Please take this smartphone with you.}

Scene 2
Location: Living Room
Concepts:
   Self-introduction
   Enable appliance operation via characters. Propose linking of appliances (such as dimming the lights)
   Environment-linked content (darken lights in dark scenes, operate fan in windy scenes, output smells using fragrances, and the like)
   Display button-based remote controller UI in response to long press of icon
   Transform character when movie ends into main character of movie.
Characters in scene: BD player, Bravia, Walkman Dock, Photo frame
Explanation: {Icons of appliances that can be operated in this room are listed on the left side of the screen of the display unit 160. When a red mark is applied to the upper left of an icon, this shows that the story related to the appliance is ready to be launched. First, try pressing the BD player icon.}

| [BD Player] | Master! Thanks for talking to me! |
|---|---|
| [BD Player] | I forgot to introduce myself, but I'm "BD"! |
| [BD Player] | I can turn on straight away, record straight away, and play back straight away! |
| [Photo Frame] | That's right, and I bet you'll stop selling straight way! |
| [BD Player] | Yeah, I'll stop selling straight away . . . Hey! What are you saying?! |
| [Photo Frame] | Umm, I had you there for a second. |
| [BD Player] | No! I was just checking. And I don't want to hear that from you. You push off now! |
| [Photo Frame] | Ho, ho! Right you are! (exits) |
| [BD Player] | That was Photo Frame, by the way. |
| [BD Player] | She's a good girl, but some of the things she comes out with . . . |
| [BD Player] | Anyway, nice to meet you. |
| [BD Player] | What should I do? |

(0: Watch Movie Trailer 1: Do nothing)

| "0" [BD Player] | Okay! Starting playback! |
|---|---|
| [BD Player] | Hey Bravia! I'm gonna play a movie! Get ready! |
| [Bravia] | I've got it! |
| [BD Player] | That's Bravia, your TV! |
| [Bravia] | I'm Bra-Bra-Bra-Bravia! (she rolls her r's) |
| [BD Player] | She gets a bit overexcited, but that's her only fault. |
| [BD Player] | To make the screen clearer, I'm going to dim the lights. |
| [BD Player] | A trailer for the disaster movie "Bio" arrived today. |
| [BD Player] | Hey, I like disaster movies, so I'm looking forward to this one. |
| [BD Player] | It's gonna be good! |

Explanation: {The characters exit. The lights are dimmed. After this, video is played back in environment-linked mode.}
Explanation: {In this way, the characters link the various appliances such as the TV and the lighting. In some cases, appliances are also operated at appropriate timing for content such as a movie (environment-linked mode). As examples, the lighting may become bright at climactic scenes and the fan of an air conditioner may be set at high in windy scenes.}
{Note that you can also use a normal button-based remote controller for each appliance. To display such remote controller, make a long press on the corresponding icon.} (The remote controller for the BD player is displayed and the characters exit).
"1": [BD Player]   Okay! I'll bring it up! (exits)

Scene 3
Location: Living Room
Concept: The music player's character recommends the soundtrack of a movie. At this point, a purchase can be made. When there is an increase in shared content that extends across a plurality of appliances, such appliances become friendlier.
Characters in scene: Walkman Dock
Explanation: {I'll just call the character of the Walkman Dock over here.}
(The user clicks (taps) the icon of the Walkman Dock)
[Dock]           Hi, I'm your Walkman Dock!
[Dock]           How did you like the "Bio" trailer? Was it good?
[Dock]           BD Player seems to like it (chuckles).
[BD Player]      (Grins and raises hands as if shooting bullets into the sky "Bang! Bang!")
[Dock]           There's an imported soundtrack on sale. Do you want to buy it?
(0: Buy          1: Not now)
Explanation: {This character is a Walkman Dock who can only play music, but she can also recommend content related to other appliances. Users can buy products according to such recommendations. When the same content increases on different appliances, the characters become friendlier.}
"0": [Dock]      Okay! Thanks! I'll get it!
[BD Player]      Hey guys!
[Dock]           Hey BD! The Master's bought us the "Bio" soundtrack!
[BD Player]      Really?
[Dock]           Yeah!
[BD Player]      Great! Thanks!
[System]         Since you've bought related content, you've increased the friendship level of these two characters.
[System]         The two characters have put on matching "Bio" costumes!
Explanation: {You can get new items when the characters become friends like this. In this scenario, a revenue-generating business is developed where character items are given away to encourage users to purchase software.}
"1" [Dock]       Okay. Let me know if you change your mind!
(Character exits)

Scene 4
Location: Terrace
Concept: Use of SNS via an agent. "Characters appeal to one another using "Pride of the House" photographs. However, since these characters have a mean side, they invite their friends and then take photographs showing them in a bad mood."
Characters in scene: Webcam
Explanation: "The webcam is the character of a fixed camera. She can't be operated and does what she likes. The webcam is connected via the network 300 to a server that collects images taken by webcams in other homes, and is capable of acquiring images taken by other webcams and displaying them on the display unit 160."
(Presses icon)
[Camera]         Oh! Me??
[Camera]         I'm your webcam.
[Camera]         You know, I'm the only one who can go out on the Internet.
[Camera]         I take photos of our treasure and show them to the world!
[Camera]         I can also take photos with other people's treasures too!
[Camera]         I'm really up on what's going on out there.
[Camera]         If you want to know something, just ask me! Hee, hee!
Explanation: {As she's described, this character goes onto the Internet and takes photos. There's an event for her, so bring her up and see what it is!}
(Taps icon)
[Camera]         Master! I've made a new friend!
[Camera]         Do you want to see a photo?
0: View 1: Not now
"0": [Camera]    Here it is!
(An image in which the webcam character and the fairy of a plant photographed by a webcam in another house or the fairy of a shoe shop appear together is displayed in close up on the smartphone)
[Camera]         Isn't that great?
{Since the camera has a mean side, the characters appear uncomfortable in the photo. Hidden at the bottom right of the photo is a message written on a piece of paper. By doing so, it is possible to automatically build a social network via an agent.}
(Advance to "2")
1: [Camera]      Okay. Sorry for bothering you (Advance to "2")
2: [Camera]      See you again. I'll tell you when I meet someone new!

Scene 5
Location: Terrace
Concept: Comparing a software update to being ill.
Characters in scene: Webcam
Explanation: {The event icon has turned into a medicine chest. Try pressing it. (the "!" icon of the webcam character is displayed using an image of a medicine chest)}
(Sad expression)
[Camera]        Ohh! Ohh!
[Dock]          What's up Camera? What's wrong?
[Camera]        I'm come down with a fever.
[Dock]          Really? Are you okay?
[Camera]        I feel terrible!
[Dock]          Shouldn't you go to hospital?
[Camera]        Yes, you're right.
[Dock]          I heard they've got good medicine at Sony Hospital.
[Camera]        Really?
[Dock]          Yeah, they made me better. You should go too!
[Camera]        Okay, I'll go. Is that okay Master?
0: Off you go!    1: Don't go!
0: [Camera]     Thanks!
[Dock]          Thanks from me too!
[Camera]        See you later!
[Dock]          Get well soon! (The two characters exit)
Explanation: {In this way, an appliance that is unwell will go to the hospital. This event occurs when there is a software update for an appliance. The aim of likening an update to a character being ill is to get the user to agree to an operation that the user does not really want to do.}
1: [Camera]     Oh!
[Dock]          Eh? She's not well!
[Dock]          Let her go!
(Return to selection of 0 or 1 above. Endless loop until user selects "Off you go!"

Scene 6
Location: Bathroom
Concept: By having the story progress through eco-friendly behavior, the user is encourage to make eco-friendly choices without resistance. The water heater provides hot water when asked but becomes increasingly worn out.
Characters in scene: Bathtub, Water Heater

| | |
|---|---|
| [Bathtub] | Hi! |
| [Bathtub] | Bath time? |
| 0: Set timer | 1: Not now |
| 1: [Bathtub] | Not yet, I gotcha! See you later. |

(Characters exit)

| | |
|---|---|
| 0: [Bathtub] | Great! When do you want it? |

(User input to indicate time and water depth. The time choices are 17:00, 19:00, and 21:00. The water depths are given as "2: Full", "3: Normal", and "4: Shallow".)

| | |
|---|---|
| 2: [Bathtub] | Up to the top today! Hey Water Heater! Fill me up at xx:00! |
| [Water Heater] | Err, okay then. |
| [Bathtub] | What's up? Are you tired? |
| [Water Heater] | . . . |
| [Bathtub] | That's not like you. |
| [Water Heater] | It's just filling you up all the time tires me out. |
| [Bathtub] | Oh! (maybe we can't play tonight) |
| [Water Heater] | What was that? |
| [Bathtub] | Err! Nothing! |
| [Bathtub] | I'm sorry, but can you do it today? The Master likes his bath! |
| [Water Heater] | All right then. |

Explanation: {In this way, if the user uses lots of hot water, i.e., does not behave in an eco-friendly manner, the characters do not act out a happy story. So, let's think of the environment and try using less hot water this time. Since this is a demo, the timer is set based on an inputted selection without referring to past records.}

(Return to the beginning, where the water depth is set at "shallow". Advance to 4)

| | |
|---|---|
| 3: [Bathtub] | Normal, I've got you! |
| [Bathtub] | Hey Water Heater! The Master wants a normal bath at xx:00! |
| [Water Heater] | Okay! |
| [Bathtub] | How are you doing? |
| [Water Heater] | Hey! I'm good |
| [Bathtub] | You sure? |
| [Water Heater] | Yeah, what is it? |
| [Bathtub] | Oh nothing. Don't forget to run the bath! The Master will be waiting. |
| [Water Heater] | Okay. |
| 4: [Bathtub] | Just a shallow bath then? |
| [Bathtub] | Ooh, you'll see my sides! Anyway catch you later! |
| [Bathtub] | Hey Water Heater! The Master wants a shallow bath at xx:00! |
| [Water Heater] | Yes! Leave it to me! |
| [Bathtub] | You seem happy today! |
| [Water Heater] | I've been feeling good recently |
| [Bathtub] | (Blushes) All right! |
| [Water Heater] | What was that? |
| [Bathtub] | Oh nothing! Don't forget to run the bath! |
| [Water Heater] | A-okay! |
| [System] | That night, when everyone has gone to bed |

(no images and only voices)

| | |
|---|---|
| [Bathtub] | (Sings) La la la!, woah, woah! |
| [Water Heater] | Doobie doobie! |
| [Bathtub] | That's not it! It's woah, woah! |
| [Water Heater] | Sorry! |
| [Bathtub] | Okay, just keep practicing! |
| [Water Heater] | I'll try! |

Explanation: {In this way, when the user makes eco-friendly choices, the story advances. By designing the story so as to access new scenes, it is possible to promote eco-friendly behavior by the player.}

Scene 7
Location: Kids' Room
Concept: A feud between the fan and the air conditioner, but they end up getting married.
Characters in scene: Fan, Air Conditioner
Explanation: "The fan has a complicated relationship with the air conditioner. It's because fans became less popular when everyone started using air conditioners. That's why fans hate air conditioners."

| | |
|---|---|
| [Fan] | That air conditioner again! |
| [Air Conditioner] | Phew! Phew! |
| [Fan] | Can't you be quiet! |

| | |
|---|---|
| [Air Conditioner] | What? I've got to hit the set temperature! |
| [Fan] | Huh? |
| [Fan] | Why doesn't anyone ask me? It's healthier to use me! And more eco. Probably! |

Explanation: {However, fans and air conditioners can actually get along. Some of you may know this, but if you turn on a fan and put an air conditioner on low, you can save power. If the Master (user) uses these appliances in this way, they start to get along much better.}

| | |
|---|---|
| [Fan] | I've been getting some work recently |
| [Air Conditioner] | Oh? Tired you out? |
| [Fan] | Oh no. That's not what I meant. I'm pleased! |
| [Air Conditioner] | Oh, okay! |
| [Fan] | I hope this keeps up. It's hard having nothing to do. |
| [Air Conditioner] | Yes, but it's up to the Master. |
| [Fan] | . . . |

Explanation: {In this way, the appliances start to get along due to the actions taken by the user. This is how things end up}

| | |
|---|---|
| [Air Conditioner] | . . . |
| [Fan] | Stop looking at me! I feel all embarrassed. |

(An image of the two characters getting married)

| | |
|---|---|
| [Air Conditioner] | I've found out how to get along with you. |
| [Air Conditioner] | Sorry for taking all your work away. |
| [Fan] | That's okay. |
| [Fan] | I didn't know you could be so nice. |
| [Air Conditioner] | . . . |
| [Fan] | . . . |
| [Air Conditioner] | Shall we tie the knot? |
| [Fan] | What! |
| [Air Conditioner] | Let's be together. I really like being with you! |
| [Fan] | Oh! |
| [Fan] | Of course, if that's all right with you. |
| [System] | The fan and the air conditioner have got married! |
| [System] | Cooperative operation commands for "Cool right down" and "Warm right up" have been added! |
| [System] | From now on, you can issue these commands at either the fan or the air conditioner. |
| [System] | Using the two appliances together is the most eco option. |

Scene 8
Location: Kids' Room
Concept: It's better to charge the storage cell with clean energy
Characters in scene: Storage Cell, Solar Cell
Explanation: {Next up are the storage cell and the solar cell. They're sisters! Let's have a look.}
(The storage cell is covered in oil)

| | |
|---|---|
| [Storage Cell] | (Out of breath) |
| [Solar Cell] | Hey, you're all oily! |
| [Storage Cell] | . . . |
| [Solar Cell] | What's up? You look exhausted! |
| [Storage Cell] | This electricity is all dirty. I'm full of electricity made from burning oil. |
| [Storage Cell] | It would be better if everyone could make clean electricity like you. |
| [Solar Cell] | So that was it. |
| [Solar Cell] | Okay, I'll do my best! |
| [Solar Cell] | I'll find some sunlight and send you some power! |
| [Storage Cell] | Ooh, that would be great! |
| [Storage Cell] | I'm fine really. Just do as you've been doing. |
| [Solar Cell] | Yes, but I hate to see you like that. |
| [Solar Cell] | I'll make more power! |
| [Storage Cell] | . . . |

Explanation: {In the world of Moe Appliances, the storage cell prefers so-called clean energy to the electricity out of the socket. The game progresses when the storage cell is charged up by her sister, the solar cell.}

| | |
|---|---|
| [Storage Cell] | (Chuckles) |
| [Solar Cell] | Hey sister! You've been in a good mood recently. |
| [Storage Cell] | . . . Thanks |
| [Storage Cell] | Thanks to your hard work, I feel great! |

Event Image (the two characters are shown enjoying a cake together)

| | |
|---|---|
| [Solar Cell] | We did it! Sister, you look great! |
| [Storage Cell] | You too! You've really grown up. |
| [Storage Cell] | Let's keep this up! |
| [Solar Cell] | Yeah! |

Scene 9
Location: Bedroom
Concept: Before going to sleep, the user checks the lifelog reported by the characters and thinks of how to live better.
Characters in scene: All
(This screen can be viewed not only on the screen of the smartphone but also on a projector set up in the bedroom)
Explanation: {And now finally to bed. Moe Appliances give the user a chance to look back on the day's activities together with the characters using logs recorded by the appliances, so that the user can notice any issues and consider how things might be done better in the future.}

| | |
|---|---|
| [Clock] | The end of another fine day. |
| [Clock] | You were back much earlier than normal today. |
| [Solar Cell] | Hey, sister, do you think he really goes to work? |
| [Storage Cell] | . . . |
| [Dock] | That's not right! He's just home early today! |
| [Clock] | But it's late. You got to relax with us at home this evening. |
| [BD Player] | I was certain I'd have more to do. |
| [Photo Frame] | Nah . . . (compared to me, you're lucky just to be turned on) |
| [Clock] | I've noticed something! |
| [Dock] | What is it? |
| [Clock] | Today, the Master used the lowest amount of electricity this past month! |
| [Fan] | Really, it's because he used me! |
| [Bravia] | No, it's down to me! |
| [Air Conditioner] | I've been off most of today! |
| [BD Player] | That'll be why. |
| [Clock] | That's right. Today's eco prize goes to the air conditioner! Clap clap! |
| [Solar Cell] | Clap clap! |
| [Storage Cell] | What about my sister? |
| [Clock] | The solar cell? |
| [Clock] | Yes, the solar cell did a great job today! Clap clap! |
| [Solar Cell] | Yeah! I did it! |
| [Storage Cell] | (smiles and claps) |
| [Clock] | But I've got some bad news. |
| [BD Player] | What's that? |
| [Storage Cell] | . . . |
| [Bathtub] | I don't want to hear it. |
| [Clock] | The price of gasoline has really gone up, so it'll be expensive to commute by car now. |
| [Clock] | Based on the Master's average daily usage, this is what it'll cost. |

(A comparison chart for commuting by car and commuting by train is displayed)

| | |
|---|---|
| [BD Player] | You're right. |
| [Bravia] | I saw it on TV, but that's gonna hurt the Master! |
| [Photo Frame] | Is that right (Don't talk about him as if he's a stranger!) |
| [Dock] | It might be better to go by train tomorrow. |
| [Fan] | Yeah, maybe. |
| [Camera] | Wait a second! |
| [Dock] | Oh, Camera! How was the hospital? |
| [Camera] | (panting) I've just got back. |
| [BD Player] | You've got a new dress! I like your crown! |
| [Camera] | Aww, thanks for noticing. You're so sharp. |
| [Camera] | They gave it to me when I went for a checkup at the hospital. |
| [Camera] | . . . |
| [Camera] | Hey, it sounds like heavy rain tomorrow! |
| [Camera] | I think the Master should go to work by car! |
| [BD Player] | Oh yeah. You've got it. |
| [Clock] | Okay, thanks for letting us know. |
| [Camera] | You're welcome |
| [Clock] | Ah, so many things to think about. |
| [Clock] | I'm feeling a bit sleepy now. |
| [Fridge] | Brrrrrr! |
| [BD Player] | Be quiet! |
| [Solar Cell] | I'm so sleepy. |
| [Storage Cell] | . . . |
| [Camera] | Back to work for me. |
| [Photo Frame] | Is it time to shutdown? |
| [Dock] | Yeah it looks like it. |
| [Clock] | Good night. See you tomorrow. |
| [Bravia] | I wanna stay up! What's up with you all? |
| [Dock] | I'm going to bed. |
| [BD Player] | I'm not sleepy, but I'm going upstairs. |
| [Bathtub] | Are you going to bed? |
| [Bathtub] | Let's have a bath (I'm waiting upstairs) |

Explanation: {In this way, enabling the user to go back through the day's log is considered extremely important in realizing a better lifestyle. This service attempts to get the characters to provide the user with a chance to make overall judgments based on the lifelog and the news.}

Scene 10
Location: Living room
Concept: The BD player acts the part
Characters in scene: BD player, etc.
(This may commence when a movie trailer ends)
(Scratches her head (rubs her eyes)
[BD Player]          Sob, sob!
[Dock]               Hey BD! Pull yourself together! What's wrong?
[Photo Frame]        BD! Calm down! Calm down!
(Quiets down and hunches over)
[BD Player]          . . .
[Dock]               BD, are you okay?
[Photo Frame]        Are you with us? (raises head, eyes appear
                     blurred)
[BD Player]          Leave me alone
[Dock, Photo Frame]  Eh?
[BD Player]          Don't be nasty (copies dialog from a movie)
[Dock, Photo Frame]  (surprised) What!?

---

Scene 11
Location: Living room
Concept: The mean story teller
Characters in scene: Photo Frame, Storage Cell, Solar Cell sitting in a row
[Photo Frame]  I'm going to tell the story of "The Giant Turnip".
[Solar Cell]   That sounds great!
[Photo Frame]  "The Giant Turnip"
[Photo Frame]  An old man had a giant turnip in his field, so he got
               everyone round to pull and up it came out of the ground.
               The end.
[Solar Cell]   . . .
[Storage Cell] . . .

---

Scene 12
Location: Living room
Concept: Dock lost in song
Characters in scene: Walkman Dock
[Dock]  ♪-♪-♪
[Dock]  ♪-♪-♪, ♪-♪-♪
[Dock]  ♪-, ♪-, ♪-
[Dock]  La, la, lah♪
Humming away, the dock fails to notice us.
Explanation: {By doing so, convenience is sacrificed in order to make the user feel more affectionately toward the appliance}

---

Scene 13
Location: Living room
Concept: Sleep mode
Characters in scene: Photo Frame
(After lengthy period with no operations)
[Photo Frame]  Ah, I'm feeling sleepy.
[Photo Frame]  Yawn!
[Photo Frame]  So sleepy.
[Photo Frame]  . . . (enters sleep mode)

6. Processing of Information Processing Apparatus

The scenarios described above include linked operations between a plurality of the appliances 200, as one example in Scene 2 a linked operation is carried out between the BD player and the room lighting apparatus. Such linked operations will be described below with reference to the flowcharts in FIGS. 11 to 14.

Figure 11:
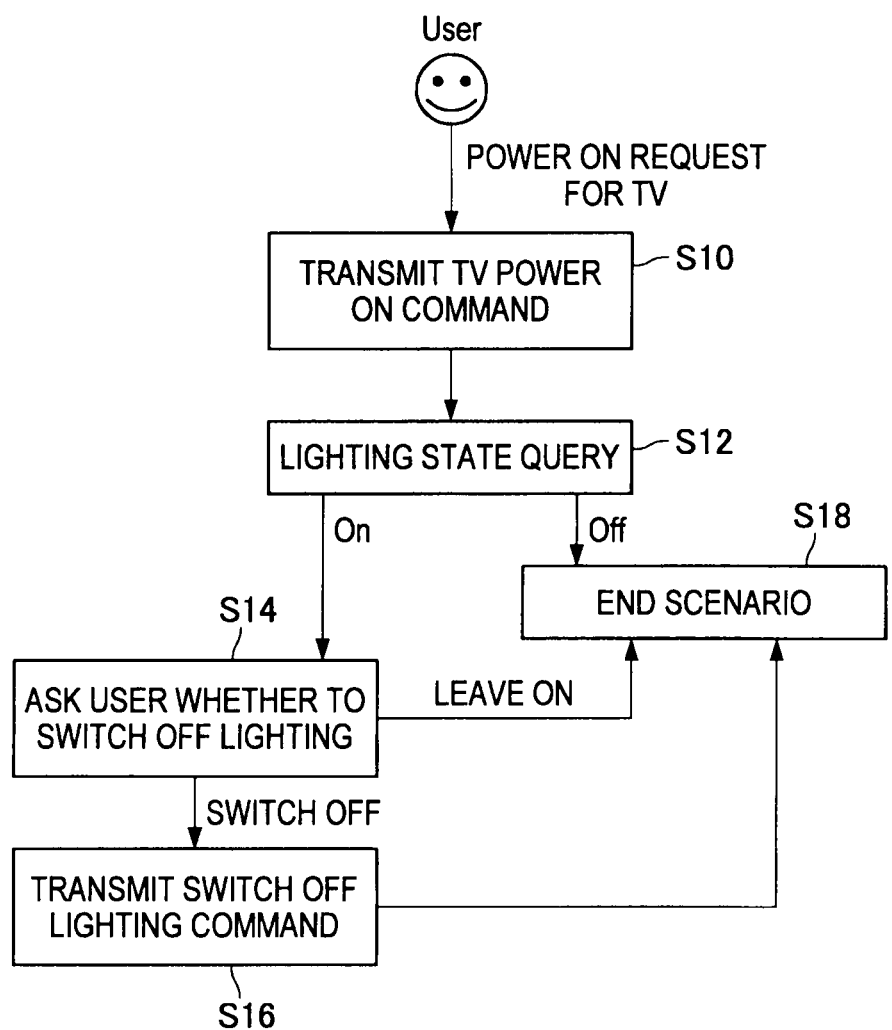

FIG. 11 is a flowchart showing a linked operation where an inquiry as to whether the room lighting is on or off is made when the power of the TV is switched on. First, when the user operates the information processing apparatus 100 to request switching on of the power of the TV, the operation information transmitting unit 120 of the information processing apparatus 100 transmits a command for switching on the power of the TV via the drivers 140 to the TV out of the appliances 200 (step S10).

Next, in step S12, the appliance information acquiring unit 112 of the information processing apparatus 100 enquires to the room lighting about the lighting state. If the lighting is on, the display processing unit 116 displays an inquiry as to whether the lighting should be switched off on the display unit 160 (step S14). When doing so, the audio processing unit 117 also has the audio output unit 170 output an inquiry as to whether the lighting should be switched off. At this time, processing that has the character corresponding to the lighting apparatus ask the user in keeping with the scenario is carried out by the character processing unit 114 so that displaying of images and outputting of speech are carried out.

If, as a result of the inquiry, the user has inputted an operation indicating that the lighting is to be switched off via the UI sensors 180, the operation information acquiring unit 118 acquires such operation and the operation information transmitting unit 120 transmits a command for switching off the lighting to the lighting apparatus (step S16). By doing so, the power of the lighting apparatus is switched off and the scenario ends (step S18).

Meanwhile, if the lighting apparatus is off in step S12, the processing proceeds to step S18 and the scenario ends. In the same way, if the user has inputted an operation indicating that the lighting is not to be switched off via the UI sensors 180, the processing proceeds to step S18 and the scenario ends.

In this way, when using the TV, since it is possible to increase the contrast of the screen and create a sense of theatre by switching off the lighting apparatus, when switching on the TV is requested, the user is asked whether the lighting should be switched off. When doing so, the characters of the respective appliances 200 can make suggestions as to how to link the appliances 200 together in keeping with the scenarios. By doing so, an optimum linking operation of the TV and the lighting apparatus is possible, and the user can watch TV in a more favorable environment.

Figure 12:
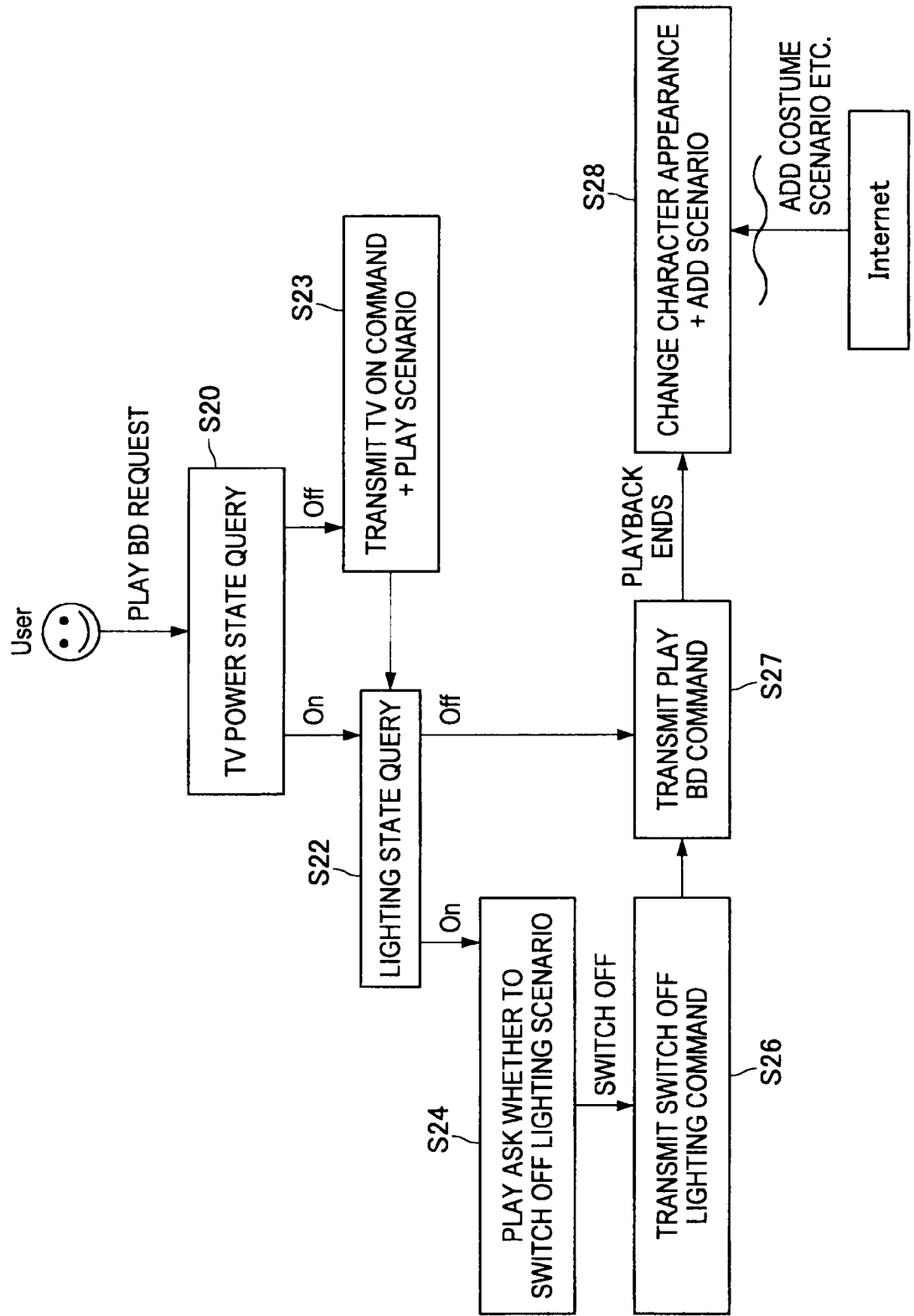
FIG. 12 is a flowchart showing linked operations of a BluRay disc (BD) player, a light, and a TV when playing back a BD.

FIG. 12 is a flowchart showing a linked operation between the BD player, the lighting apparatus, and the TV when playing back a BD disc. First, when the user operates the information processing apparatus 100 to request switching on the power of the TV, the appliance information acquiring unit 112 of the information processing apparatus 100 enquires to the TV about the present power state (step S20).

When the power of the TV is on, the processing proceeds to step S22. In step S22, the appliance information acquiring unit 112 of the information processing apparatus 100 enquires to the room lighting about the present lighting state. When the lighting is on, the display processing unit 116 displays an inquiry as to whether the lighting should be switched off on the display unit 160 (step S24). When doing so, the audio processing unit 117 also has the audio output unit 170 output an inquiry as to whether the lighting should be switched off. In this case also, processing that has the characters corresponding to the respective appliances 200 ask the user in keeping with the scenario is carried out by the character processing unit 114 so that displaying of images and outputting of speech are carried out.

If, as a result of the inquiry, the user has inputted an operation indicating that the lighting is to be switched off via the UI sensors 180, the operation information acquiring unit 118 acquires such operation and the operation information transmitting unit 120 transmits a command for switching off the lighting to the lighting apparatus (step S26). By doing so, the power of the lighting apparatus is switched off. After this, in step S27, the operation information transmitting unit 120 transmits a command for playing back a BD to the BD player.

Meanwhile, if the power of the TV is off in step S20, the processing proceeds to step S23. In step S23, the operation information transmitting unit 120 transmits a command for switching on the power of the TV to the TV. Also, when doing so, a scenario for the characters is played back in accordance with the power of the TV being switched on. After step S23, the processing proceeds to step S22.

Also, if the lighting apparatus is off in step S22, the processing proceeds to step S27 where the operation information transmitting unit 120 transmits a command for playing back a BD to the BD player. After playback of a BD in step S27 has ended, in accordance with the end of BD playback, the external appearance of the character corresponding to the BD player is changed, a scenario after BD playback is added and displayed, and speech is also outputted (step S28).

Figure 13:
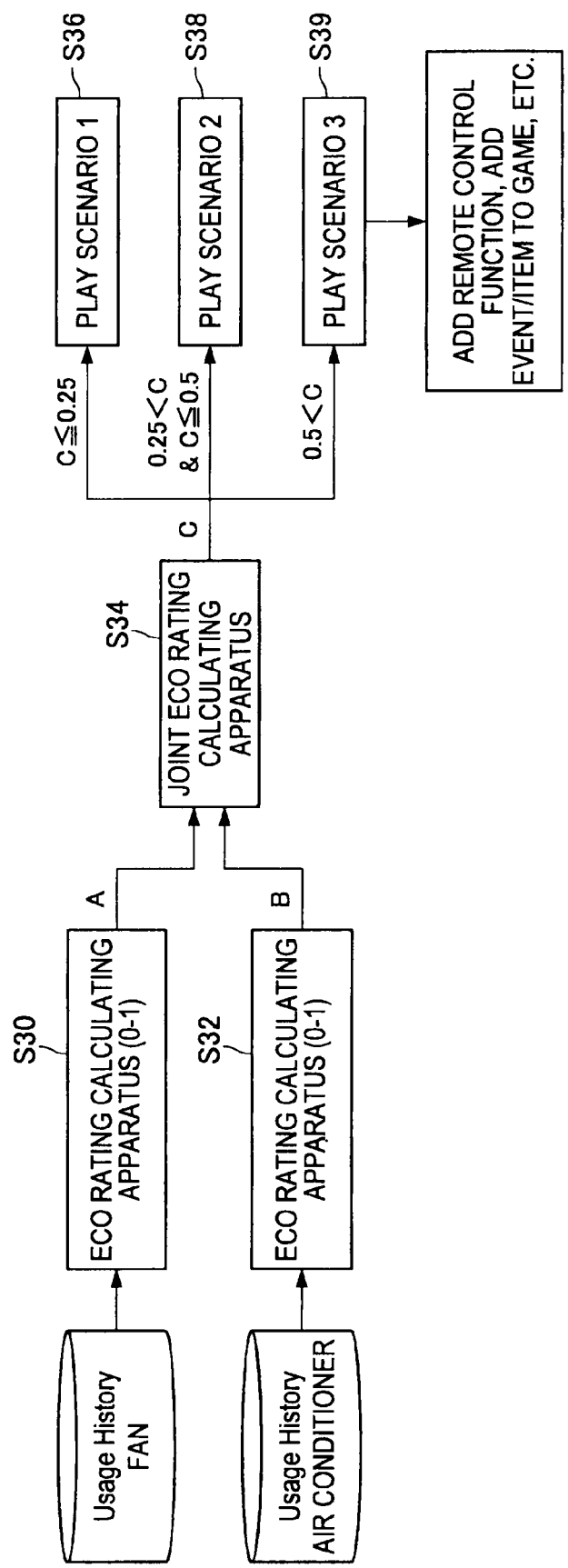
FIG. 13 is a flowchart showing linked operations of a fan and an air conditioner.

Also, FIG. 13 is a flowchart showing a linked operation of the fan and the air conditioner, and corresponds to Scene 10 described above, for example. The operating states of both the fan and air conditioner are adjusted in accordance with eco ratings. First, an eco rating calculating unit included in the appliance information acquiring unit 112 of the information processing apparatus 100 calculates eco ratings from the operating states of the fan and the air conditioner (steps S30, S32). Here, the values of the eco ratings are values between 0 and 1, with high values representing a higher eco rating and showing lower power consumption.

Next, the joint eco rating calculating unit included in the appliance information acquiring unit 112 calculates a joint eco rating C from the respective eco ratings of the fan and the air conditioner (step S34). The value of the joint eco rating is also between 0 and 1, with a high value representing a higher eco rating and showing lower power consumption. As one example, the joint eco rating C can be set as the average value of the respective eco ratings of the fan and the air conditioner. Different scenarios 1 to 3 are then played back in accordance with the joint eco rating C to encourage the user to operate the fan and the air conditioner to produce the lowest joint eco rating C. More specifically, when $C \leq 0.25$, scenario 1 is played back, when $0.25 < C \leq 0.5$, scenario 2 is played back, and $C > 0.5$, scenario 3 is played back (steps S36, S38, S39). Since scenario 1 is played back when the joint eco rating C is low, scenario 1 recommends the user to use the fan whose eco rating is higher and to make less use of the air conditioner. Since scenario 3 is played back when the joint eco rating C is high, scenario 3 recommends the user to keep using the fan and the air conditioner in the present state. The character processing unit 114 reads out one of such scenarios from the storage unit 150 in accordance with the present usage state of the appliances 200 and has conversations between characters and the scenario displayed on the display unit 160 and has audio and/or speech outputted from the audio output unit 170.

Figure 14:
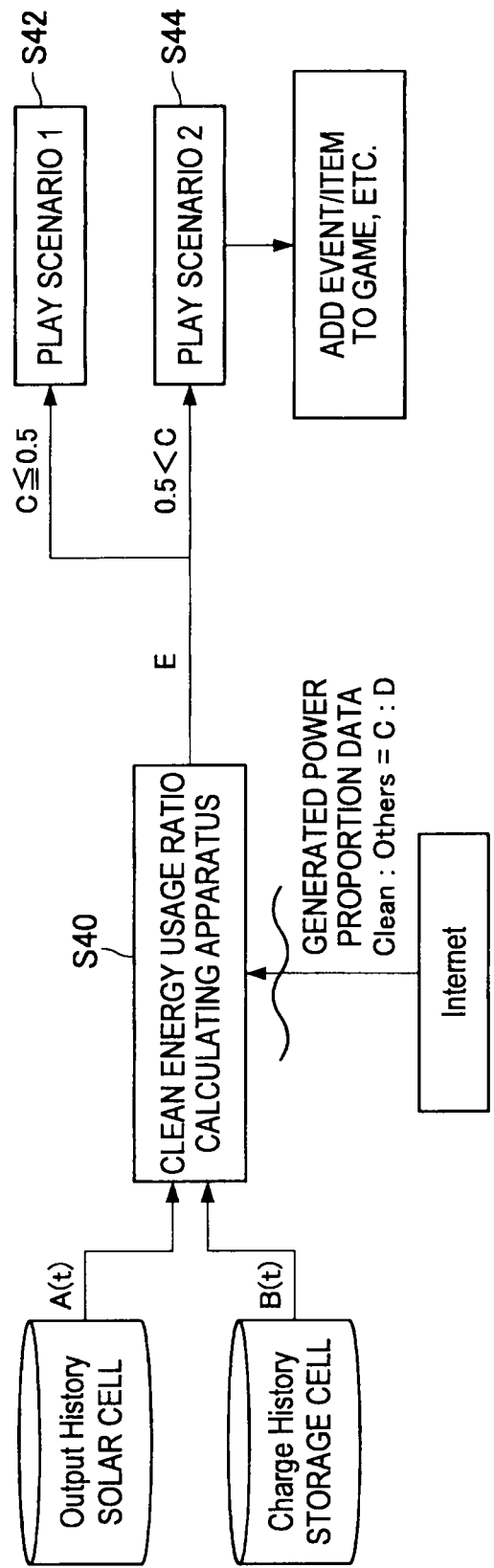
FIG. 14 is a flowchart showing linked operations of a solar cell and a storage cell.
Figure 15:
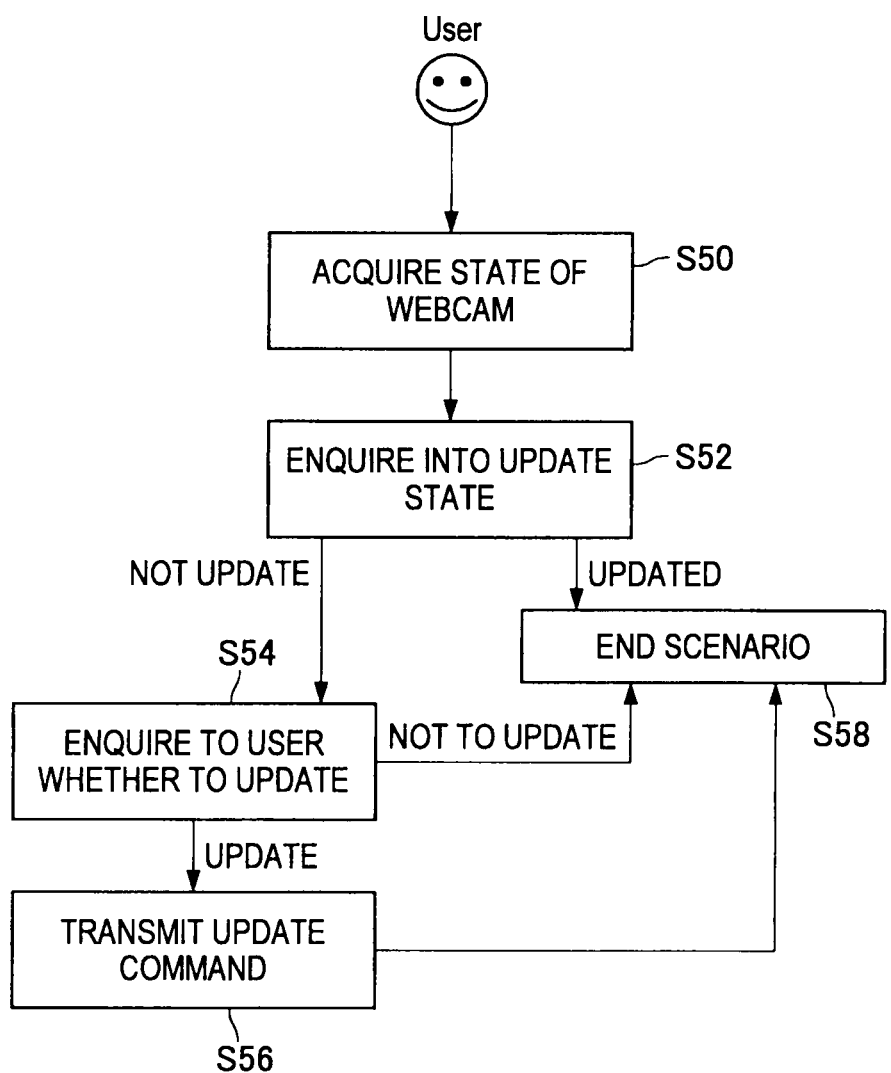
FIG. 15 is a flowchart showing an updating process for software.

FIG. 14 is a flowchart showing a linked operation of the solar cell and a storage cell, and corresponds to Scene 11 described above, for example. A clean energy usage calculating apparatus included in the appliance information acquiring unit 112 of the information processing apparatus 100 calculates the clean energy usage ratio C from the operating states of the solar cell and the storage cell (step S40). Here, the clean energy usage ratio C represents the proportion of clean energy produced by the solar cell out of the total energy. Generated power proportion data represents the ratio (C:D) of the clean energy (C) produced by the solar cell to the other energy (energy in the storage cell), and the scenario changes in accordance with the value of C for the case where total energy is set as 1. Scenario 1 is played back when the clean energy usage ratio $C \leq 0.5$, and scenario 2 is played back when the clean energy usage ratio $C > 0.5$ (steps S40, S42). Since scenario 1 is played back when the clean energy usage ratio C is low, scenario 1 recommends the user to use clean energy produced by the solar cell and to use less of the energy in the storage cell. Since scenario 2 is played back when the clean energy usage ratio C is high, scenario 2 recommends the user to keep using the solar cell and the storage cell in the present state. The character processing unit 114 reads out one of such scenarios from the storage unit 150 in accordance with the present usage state of the appliances 200 and has conversations between characters and the scenario displayed on the display unit 160 and has audio and/or speech outputted from the audio output unit 170.

In this way, by changing the scenario in accordance with the clean energy usage ratio C, by showing a corresponding scenario when the clean energy usage ratio C is low, it is possible to encourage the user to make greater use of power from the solar cell than from the storage cell.

FIG. 14 is a flowchart showing an updating process for software and corresponds to Scene 6 described above, for example. First, in step S50, the user who has recognized that an event (an exclamation point) has occurred for the icon of the webcam on the display screen of the display unit 160 inputs an instruction for acquiring the state of the webcam into the UI sensors 180 and such instruction is acquired by the operation information acquiring unit 118 (step S50).

Next, in step S52, the appliance information acquiring unit 112 of the information processing apparatus 100 enquires about the update state of the software of the webcam. Also, when the software has not been updated to the latest version, the display processing unit 116 has an inquiry as to whether to update the software displayed on the display unit 160 (step S54). When doing so, the audio processing unit 117 has the audio output unit 170 output an inquiry as to whether to update the software. At this time, the character processing unit 114 carries out processing that has the character corresponding to the webcam make an inquiry to the user in keeping with a scenario and thereby has images displayed and audio/speech outputted.

If, as a result of the inquiry, an operation indicating that the software is to be updated has been inputted from the UI sensors 180, the operation information acquiring unit 118 acquires such operation and the operation information transmitting unit 120 transmits a command for updating the software to the webcam (step S56). By doing so, the software of the webcam is updated to the latest version and the scenario ends (step S58).

Also, if in step S52 the software of the webcam has been updated to the latest version, the processing proceeds to step S58 and the scenario ends. Also, if in step S54, the user has inputted, via the UI sensors 180, an operation indicating that updating of the software is not to be carried out, the processing proceeds to step S58 and the scenario ends.

As described above, by carrying out processing related to characters that personify the appliances 200, by changing the characters in accordance with the states of the appliances 200 or operation information for operating the appliances 200, it is possible to make the user empathize with the characters and to promote usage of the appliances 200.

Although preferred embodiments of the present disclosure have been described in detail with reference to the attached drawings, the present disclosure is not limited to the above examples. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)
An information processing apparatus including:
an operation information transmitting unit transmitting operation information for operating respective appliances out of a plurality of appliances connected via a network;
a character processing unit carrying out processing relating to characters, which correspond to the respective appliances and have individual personalities, and changes a content represented by the characters in accordance with the operation information for operating the appliances; and
a display processing unit carrying out processing that displays the characters on a display unit.

(2)
An information processing apparatus according to (1),
further including an appliance information acquiring unit acquiring states of the plurality of appliances,
wherein the character processing unit changes the content represented by the characters in accordance with the states of the appliances or the operation information for operating the appliances.

(3)
An information processing apparatus according to (2),
wherein the operation information transmitting unit transmits, in keeping with a state of an arbitrary appliance acquired by the appliance information acquiring unit, operation information for operating another of the appliances.

(4)
An information processing apparatus according to (1),
further including an audio processing unit that carries out processing for outputting speech and/or audio of characters in accordance with processing by the character processing unit.

(5)
An information processing apparatus according to (1),
further including a storage unit storing a plurality of conversations relating to the characters or a plurality of scenarios,
wherein based on operation information for operating the appliances, the character processing unit applies the conversations relating to the characters or the scenarios stored in the storage unit to the characters and changes the conversations relating to the characters or the scenarios.

(6)
An information processing method including,
transmitting operation information for operating respective appliances out of a plurality of appliances connected via a network;
carrying out processing relating to characters, which correspond to the respective appliances and have individual personalities, and changing a content represented by the characters in accordance with the operation information for operating the appliances; and
carrying out processing that displays the characters on a display unit.

(7)
A program causing a computer to function as:
a device transmitting operation information for operating respective appliances out of a plurality of appliances connected via a network;
a device carrying out processing relating to characters, which correspond to the respective appliances and have individual personalities, and changing a content represented by the characters in accordance with the operation information for operating the appliances; and
a device carrying out processing that displays the characters on a display unit.

The present disclosure contains subject matter related to that disclosed in Japanese Priority Patent Application JP 2011-078318 filed in the Japan Patent Office on Mar. 31, 2011, the entire content of which is hereby incorporated by reference.

What is claimed is:

1. An information processing apparatus comprising:
circuitry configured to:
transmit operation information to operate respective appliances out of a plurality of appliances connected via a network;
carry out processing relating to a plurality of characters, each of said plurality of characters corresponding to a respective appliance and each of said plurality of characters being assigned individual personalities for conversation between at least one of the plurality of appliances and a user and between the plurality of appliances, and change a content of dialog represented by each of the plurality of characters in accordance with the operation information for operating the appliances;
allow the conversation between the at least one of the plurality of appliances and the user and between the plurality of appliances; and
carry out processing that displays the plurality of characters on a display and that displays the conversation between the at least one of the plurality of appliances and the user and between the plurality of appliances, each of said plurality of characters being represented by virtual characters,
wherein the conversation includes the content of dialog between the at least one of the plurality of appliances and the user and between the plurality of appliances, and
wherein the content of dialog includes additional commentary separate from state information corresponding to the respective appliances.

2. The information processing apparatus according to claim 1,
wherein said circuitry is configured to acquire states of the plurality of appliances, and
wherein said circuitry is configured to change the content of dialog represented by each of the plurality of characters in accordance with the states of the appliances and the operation information for operating the appliances.

3. The information processing apparatus according to claim 2,
wherein said circuitry is configured to transmit, in keeping with a state of an arbitrary appliance acquired by said circuitry, other operation information for operating at least one other of the appliances.

4. The information processing apparatus according to claim 1,
wherein said circuitry is configured to carry out processing for outputting speech and/or audio of the plurality of characters in accordance with the processing relating to the plurality of characters.

5. The information processing apparatus according to claim 1,
wherein said circuitry is configured to store a plurality of conversations relating to the plurality of characters or a plurality of scenarios, and
wherein based on the operation information to operate the appliances, said circuitry is configured to apply the plurality of conversations relating to the plurality of characters or the plurality of scenarios to the plurality of characters and to change the plurality of conversations relating to the plurality of characters or the plurality of scenarios.

6. The information processing apparatus according to claim 1, wherein the content of dialog represented by each of the plurality of characters includes at least one of a textual content representing said conversation between each of the plurality of appliances and the user and a picture content representing a facial expression.

7. The information processing apparatus according to claim 1, wherein said circuitry is configured to store the user's daily usage pattern of the plurality of appliances.

8. The information processing apparatus according to claim 1, wherein said circuitry is configured to change the content of dialog represented by each of the plurality of characters in accordance with a change in the conversation between the plurality of appliances and the user.

9. The information processing apparatus according to claim 1, wherein said circuitry is configured to:
  store a plurality of conversations relating to a plurality of scenarios;
  calculate eco ratings for each of the plurality of appliances based on operating states of each of the plurality of appliances; and
  select a first scenario from the plurality of scenarios for the conversation between the at least one of the plurality of appliances and the user based on said calculated eco ratings.

10. The information processing apparatus according to claim 1, wherein said circuitry is configured to:
  store a plurality of conversations relating to a plurality of scenarios;
  calculate a clean energy usage ratio for each of the plurality of appliances based on operating states of each of the plurality of appliances; and
  select a first scenario from the plurality of scenarios for the conversation between the at least one of the plurality of appliances and the user based on said calculated clean energy usage ratio.

11. The information processing apparatus according to claim 1, wherein the conversation is part of a scenario that includes a plurality of conversations between the plurality of appliances and between the at least one of the plurality of appliances and the user.

12. An information processing method comprising:
  transmitting, using a processor, operation information to operate respective appliances out of a plurality of appliances connected via a network;
  carrying out processing relating to a plurality of characters, each of said plurality of characters corresponding to a respective appliance and each of said plurality of characters being assigned individual personalities for conversation between at least one of the plurality of appliances and a user and between the plurality of appliances, and changing a content of dialog represented by each of the plurality of characters in accordance with the operation information for operating the appliances;
  allowing the conversation between the at least one of the plurality of appliances and the user and between the plurality of appliances; and
  carrying out processing that displays the plurality of characters on a display and that displays the conversation between the at least one of the plurality of appliances and the user and between the plurality of appliances, each of said plurality of characters being represented by virtual characters,
  wherein the conversation includes the content of dialog between the at least one of the plurality of appliances and the user and between the plurality of appliances, and
  wherein the content of dialog includes additional commentary separate from state information corresponding to the respective appliances.

13. A non-transitory computer-readable storage medium storing computer-readable instructions that, when executed by a computer, cause the computer to execute a method comprising:
  transmitting operation information to operate respective appliances out of a plurality of appliances connected via a network;
  carrying out processing relating to a plurality of characters, each of said plurality of characters corresponding to a respective appliance and each of said plurality of characters being assigned individual personalities for conversation between at least one of the plurality of appliances and a user and between the plurality of appliances, and changing a content of dialog represented by each of the plurality of characters in accordance with the operation information for operating the appliances;
  allowing the conversation between the at least one of the plurality of appliances and the user and between the plurality of appliances; and
  carrying out processing that displays the plurality of characters on a display and that displays the conversation between the at least one of the plurality of appliances and the user and between the plurality of appliances, each of said plurality of characters being represented by virtual characters,
  wherein the conversation includes the content of dialog between the at least one of the plurality of appliances and the user and between the plurality of appliances, and
  wherein the content of dialog includes additional commentary separate from state information corresponding to the respective appliances.

* * * * *